United States Patent
Takenaka et al.

(10) Patent No.: US 10,750,103 B2
(45) Date of Patent: Aug. 18, 2020

(54) IMAGING DEVICE, DRIVE METHOD OF IMAGING DEVICE, AND IMAGING SYSTEM

(71) Applicant: CANON KABUSHIKI KAISHA, Tokyo (JP)

(72) Inventors: Shintaro Takenaka, Yokohama (JP); Yasuji Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/353,964

(22) Filed: Mar. 14, 2019

(65) Prior Publication Data

US 2019/0215469 A1    Jul. 11, 2019

Related U.S. Application Data

(63) Continuation of application No. 15/419,592, filed on Jan. 30, 2017, now Pat. No. 10,277,839.

(30) Foreign Application Priority Data

Feb. 16, 2016    (JP) ................ 2016-027193

(51) Int. Cl.
*H04N 5/376*    (2011.01)
*H04N 5/345*    (2011.01)
*H04N 5/347*    (2011.01)
*H04N 5/3745*    (2011.01)
*H04N 5/341*    (2011.01)

(52) U.S. Cl.
CPC .......... *H04N 5/3452* (2013.01); *H04N 5/347* (2013.01); *H04N 5/3456* (2013.01); *H04N 5/376* (2013.01); *H04N 5/37455* (2013.01); *H04N 5/37457* (2013.01); *H04N 5/341* (2013.01)

(58) Field of Classification Search
None
See application file for complete search history.

(56) References Cited

U.S. PATENT DOCUMENTS

| | | | |
|---|---|---|---|
| 7,999,866 B2 | 8/2011 | Sonoda | |
| 8,049,799 B2 | 11/2011 | Sonoda | |
| (Continued) | | | |

FOREIGN PATENT DOCUMENTS

| | | |
|---|---|---|
| JP | 2011-244329 | 12/2011 |
| JP | 2008-288903 | 11/2018 |

OTHER PUBLICATIONS

Japanese Office Action dated Dec. 3, 2019 during prosecution of related Japanese application No. 2016-027193. (English-language machine translation included.).

*Primary Examiner* — Twyler L Haskins
*Assistant Examiner* — Wesley J Chiu
(74) *Attorney, Agent, or Firm* — Venable LLP

(57) ABSTRACT

Provided is an imaging device including row drive unit having a first storage unit that stores and outputs a first signal for a readout from the pixels on an associated row, a second storage unit that stores and outputs a second signal for an operation for causing the photoelectric conversion element on an associated row to be reset to a charge accumulation state, and a third storage unit that stores and outputs a third signal for maintaining the photoelectric conversion element on an associated row in a charge accumulation state or a reset state based on the first signal output from the first storage unit and the second signal output from the second storage unit.

16 Claims, 11 Drawing Sheets

(56) References Cited

U.S. PATENT DOCUMENTS

| | | |
|---|---|---|
| 8,081,246 B2 | 12/2011 | Takenaka |
| 8,305,473 B2 | 11/2012 | Takenaka |
| 8,363,137 B2 | 1/2013 | Sonoda |
| 8,451,355 B2 | 5/2013 | Makino |
| 8,466,994 B2 | 6/2013 | Takenaka |
| 8,493,486 B2 | 7/2013 | Takenaka |
| 8,670,058 B2 | 3/2014 | Hayashi |
| 8,785,832 B2 | 7/2014 | Ikeda |
| 9,159,750 B2 | 10/2015 | Ikeda |
| 9,270,913 B2 | 2/2016 | Hiyama |
| 9,438,839 B2 | 9/2016 | Hiyama |
| 9,549,139 B2 | 1/2017 | Ikeda |
| 2004/0119863 A1* | 6/2004 | Cho ............ H04N 3/155 348/308 |
| 2008/0284876 A1* | 11/2008 | Makino ........ H04N 5/341 348/231.99 |
| 2009/0086049 A1* | 4/2009 | Fujita .......... H04N 5/3597 348/222.1 |
| 2010/0201856 A1* | 8/2010 | Hayashi ....... H04N 5/3452 348/296 |
| 2010/0328507 A1 | 12/2010 | Kikutsugi |
| 2011/0228122 A1* | 9/2011 | Takenaka ..... H04N 5/3452 348/222.1 |
| 2011/0242383 A1* | 10/2011 | Yamazaki ..... H04N 5/3742 348/302 |
| 2011/0267513 A1 | 11/2011 | Sonoda |
| 2011/0285887 A1* | 11/2011 | Takenaka ..... H04N 5/374 348/300 |
| 2012/0013778 A1 | 1/2012 | Sonoda |
| 2014/0078358 A1 | 3/2014 | Takenaka |
| 2014/0092285 A1* | 4/2014 | Moriyama .... H04N 5/235 348/297 |
| 2014/0312207 A1 | 10/2014 | Ikeda |
| 2015/0129744 A1 | 5/2015 | Sonoda |
| 2016/0112661 A1 | 4/2016 | Yamamoto |
| 2016/0150176 A1 | 5/2016 | Hiyama |
| 2017/0155863 A1* | 6/2017 | Shikina ........ H04N 5/3765 |
| 2018/0220096 A1* | 8/2018 | Shikina ........ H04N 5/376 |

\* cited by examiner

FIG. 4

PTX(x) OUTPUT VALUE

|  |  | lat_rd(x) | |
|---|---|---|---|
|  |  | 0 | 1 |
| lat_sh(x) | 0 | lat_fix(x) | ptx_rd |
|  | 1 | ptx_sh | |

FIG. 10A

PTX1(x) OUTPUT VALUE

| lat_sh1(x) | | lat_sh2(x) | | lat_rd(x) | |
|---|---|---|---|---|---|
| 0 | 1 | 0 | 1 | 0 | 1 |
| | | | | lat_fix1(x) | ptx1_rd |
| | | | | Low | |
| | | | | ptx_sh | |

FIG. 10B

PTX2(x) OUTPUT VALUE

| lat_sh2(x) | | lat_sh1(x) | | lat_rd(x) | |
|---|---|---|---|---|---|
| 0 | 1 | 0 | 1 | 0 | 1 |
| | | | | lat_fix2(x) | ptx2_rd |
| | | | | Low | |
| | | | | ptx_sh | |

IMAGING DEVICE, DRIVE METHOD OF IMAGING DEVICE, AND IMAGING SYSTEM

This application is a continuation of U.S. application Ser. No. 15/419,592, filed Jan. 30, 2017, which claims priority to Japan 2016-027193, filed on Feb. 16, 2016, the contents of each of which is hereby incorporated by reference.

BACKGROUND OF THE INVENTION

Field of the Invention

The present invention relates to an imaging device, a drive method of an imaging device, and an imaging system.

Description of the Related Art

A row selection unit of an imaging device of Japanese Patent Application Laid-open No. 2011-244329 has a plurality of storage units that store addresses of a row to be read out, a row to be shuttered, and a row on which the potentials of photodiodes are fixed. Japanese Patent Application Laid-open No. 2011-244329 discloses that this configuration allows the imaging device to set a row to be read out and a row to be shuttered while fixing photoelectric conversion units on a part of rows to a reset state.

The imaging device of Japanese Patent Application Laid-open No. 2011-244329 requires a third storage unit to store, in a time-division manner, decoded values corresponding to addresses of a plurality of rows on which a readout has been completed. Furthermore, this imaging values corresponding to those rows from the third storage unit in a time-division manner in order to put photodiodes from a reset state to a charge accumulation state. This results in a complicated drive method of the imaging device of Japanese Patent Application Laid-open No. 2011-244329.

SUMMARY OF THE INVENTION

According to one embodiment of the present invention, provided is an imaging device that includes: a pixel unit in which pixels are arranged to form a plurality of rows, each of the pixels including a photoelectric conversion element that generates and accumulates charges in accordance with an incident light; and a scanning unit including row drive units, each of the row drive units being arranged associated with each of the rows of the pixel unit and outputting a drive signal for driving the pixel unit on a row basis, in which each of the row drive units includes a first storage unit configured to store a first signal for a readout from the pixels on an associated row and configured to output the first signal, a second storage unit configured to store a second signal for an operation for causing the photoelectric conversion element on an associated row to be reset to a charge accumulation state and configured to output the second signal, and a third storage unit configured to store a third signal for maintaining the photoelectric conversion element on an associated row in a charge accumulation state or a reset state based on the first signal output from the first storage unit and the second signal output from the second storage unit and configured to output the third signal.

According to one embodiment of the present invention, provided is an imaging system that includes: an imaging device including a pixel unit in which pixels are arranged to form a plurality of rows, each of the pixels including a photoelectric conversion element that generates and accumulates charges in accordance with an incident light, and a scanning unit including row drive units, each of the row drive units arranged associated with each of the rows of the pixel unit and outputting a drive signal for driving the pixel unit on a row basis, in which each of the row drive units includes: a first storage unit configured to store a first signal for a readout from the pixels on an associated row and configured to output the first signal, a second storage unit configured to store a second signal for an operation for causing the photoelectric conversion element on an associated row to be reset to a charge accumulation state and configured to output the second signal, and a third storage unit configured to store a third signal for maintaining the photoelectric conversion element on an associated row in a charge accumulation state or a reset state based on the first signal output from the first storage unit and the second signal output from the second storage unit and configured to output the third signal; and a signal processing unit configured to process a signal output from the imaging device.

According to one embodiment of the present invention, provided is a drive method of an imaging device that includes: a pixel unit in which pixels are arranged to form a plurality of rows, each of the pixels including a photoelectric conversion element that generates and accumulates charges in accordance with an incident light, and a scanning unit including row drive units, each of the row drive units arranged associated with each of the rows of the pixel unit and outputting a drive signal for driving the pixel unit on a row basis, the drive method including: at each of the row drive units, storing and outputting a first signal for a readout from the pixels on an associated row; storing and outputting a second signal for an operation for causing the photoelectric conversion element on an associated row to be reset to a charge accumulation state; and storing and outputting a third signal for maintaining the photoelectric conversion element on an associated row in a charge accumulation state or a reset state based on the first signal and the second signal.

Further features of the present invention will become apparent from the following description of exemplary embodiments with reference to the attached drawings.

BRIEF DESCRIPTION OF THE DRAWINGS

FIG. 4 is a truth table in a transfer signal generating unit according to the first embodiment.

FIG. 10A and FIG. 10B are truth tables in a transfer signal generating unit of the third embodiment.

DESCRIPTION OF THE EMBODIMENTS

Preferred embodiments of the present invention will now be described in detail in accordance with the accompanying drawings.

First Embodiment

Figure 1:
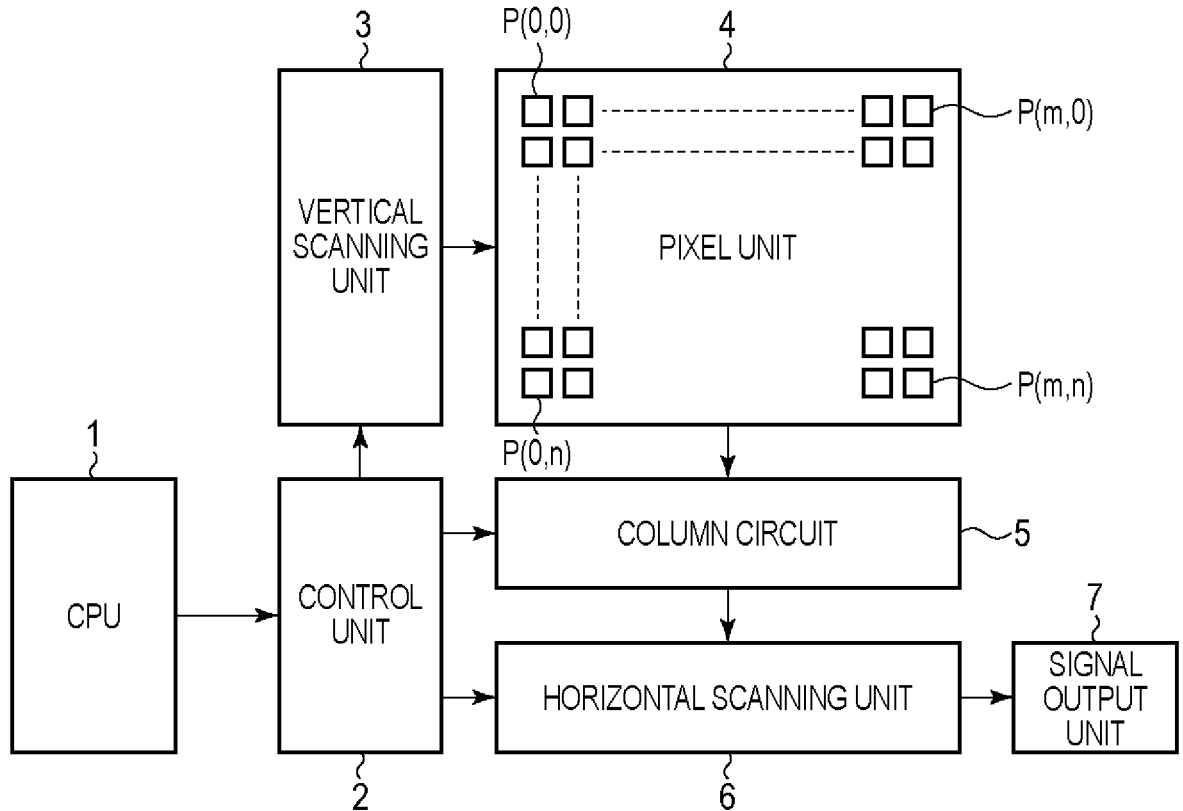
FIG. 1 is a block diagram of an imaging device according to a first embodiment.

FIG. 1 is a block diagram schematically illustrating an imaging device according to the first embodiment. The imaging device has a CPU 1, a control unit 2, a vertical scanning unit 3, a pixel unit 4, a column circuit 5, a horizontal scanning unit 6, and a signal output unit 7. The CPU 1 controls the imaging device. The control unit 2 operates in response to control signals such as a synchronous signal and setting signals such as for an operation mode from the CPU 1. The pixel unit 4 has a plurality of pixels P(0, 0) to P(m, n) of (n+1) rows by (m+1) columns arranged to form multiple rows by multiple columns. Here, a row direction refers to the horizontal direction in a drawing sheet, and a column direction refers to the vertical direction in a drawing sheet. Further, numerals in a parenthesis of a pixel P(m, n) represent a column number and a row number in this order. Further, the row number of the top row is 0-th row, and the column number of the top column is 0-th column. Note that the CPU 1 may be provided within an imaging system on which the imaging device is mounted, that is, provided outside the imaging device.

The vertical scanning unit 3 performs a readout scan and an electronic shutter scan of the pixel unit 4 in response to a control signal from the control unit 2. Note that the shutter scan refers to an operation of causing pixels on a part of or all of the rows of the pixel unit 4 to start exposure by sequentially releasing a reset state of photoelectric conversion elements to a charge accumulation state. The readout scan refers to an operation of causing pixels on a part of or all of the rows of the pixel unit 4 to sequentially output signals that are based on charges accumulated in photoelectric conversion elements. The column circuit 5 has an amplification circuit, an analog-to-digital conversion (AD conversion) circuit, and a memory. The column circuit 5 amplifies a signal from the pixel unit 4, performs AD conversion on the amplified signal, and holds the converted signal as a digital signal in the memory. The horizontal scanning unit 6 sequentially scans and outputs a signal held in the memory of the column circuit 5 in response to a control signal from the control unit 2. The signal output unit 7 has a digital processing unit, a parallel-to-serial conversion circuit, and an output circuit such as a low voltage differential signaling (LVDS). The signal output unit 7 performs digital processing of a signal output from the horizontal scanning unit 6 and outputs the processed signal as serial data to the outside of the imaging device. Note that the column circuit 5 is not required to have an AD conversion function and, for example, the configuration may be modified such that AD conversion is performed outside the imaging device. In this case, the configurations of the horizontal scanning unit 6 and the signal output unit 7 are also properly modified so as to be adapted to analog signal processing.

Figure 2:
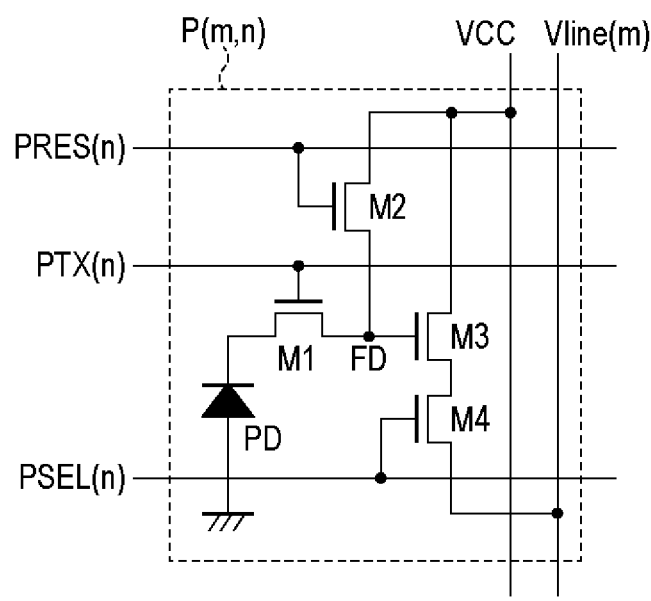
FIG. 2 is a circuit diagram of a pixel according to the first embodiment.

FIG. 2 is a circuit diagram of a pixel P according to the present embodiment. In FIG. 2, the pixel P(m, n) represents a pixel arranged at the n-th row and the m-th column of the pixel unit 4. The pixel P has a photodiode (hereafter, referred to as "PD"), a floating diffusion (hereafter, referred to as "FD"), a transfer transistor M1, a reset transistor M2, an amplification transistor M3, and a selection transistor M4. The PD is a photoelectric conversion element that performs photoelectric conversion to generate and accumulate charges in accordance with an incident light. The transfer transistor M1 transfers charges from the PD to the FD that is an input node of the amplification transistor M3. The FD holds charges transferred via the transfer transistor M1. The reset transistor M2 resets the voltage of the FD to a predetermined voltage. The amplification transistor M3 outputs, to the m-th vertical output line Vline(m) via the selection transistor M4, a signal which is based on a potential of the FD that varies in accordance with transferred charges. The drains of the reset transistor M2 and the amplification transistor M3 are electrically connected to a pixel power source VCC. The source of the amplification transistor M3 is electrically connected to a current source (not illustrated) via the selection transistor M4 and the vertical output line Vline(m) and operates as a source follower circuit. That is, the amplification transistor M3 is able to output a signal in accordance with a potential of the FD connected to the gate terminal. Note that, although each transistor can be formed of an N-channel transistor, it may be formed of a P-channel transistor.

A signal PTX(n) is a signal for controlling the transfer transistor M1 on the n-th row and is input to the gate of the transfer transistor M1. A signal PRES(n) is a signal for controlling the reset transistor M2 on the n-th row and is input to the gate of the reset transistor M2. A signal PSEL(n) is a signal for controlling the selection transistor M4 on the n-th row and is input to the gate of the selection transistor M4. Each transistor is in a conductive state when a high-level signal is input to the gate, and is in a non-conductive state when a low-level signal is input to the gate. Further, a high level corresponds to a logic value "1", and a low level corresponds to a logic value "0".

Figure 3:
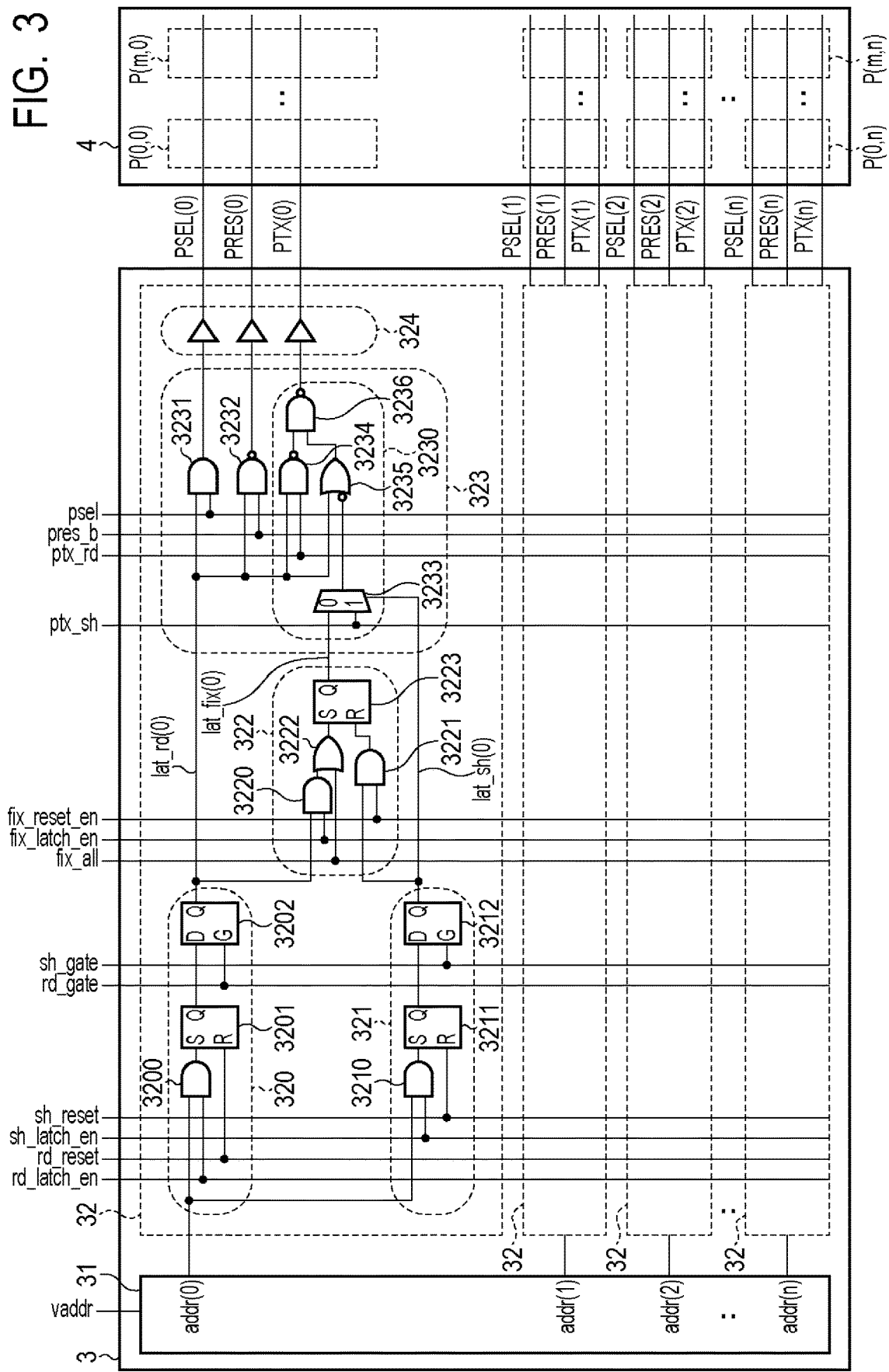
FIG. 3 is a block diagram of a vertical scanning unit according to the first embodiment.

FIG. 3 is a block diagram of the vertical scanning unit 3. The vertical scanning unit 3 has an address decoder unit 31 and n+1 row drive units 32. The address decoder unit 31 decodes an address signal vaddr generated by the control unit 2 to generate decoded signals addr(0) to addr(n) and outputs them to respective row drive units 32. The address signal vaddr is a signal indicating a row number to be driven of the pixel unit 4, and the decoded signals addr(0) to addr(n) are signals for selecting the row drive unit 32 associated with a driven row of the pixel unit 4.

The row drive unit 32 includes a first storage unit 320, a second storage unit 321, a third storage unit 322, a pixel drive signal generating unit 323, and a level shifter 324. Note that signals rd_latch_en, rd_reset, sh_latch_en, sh_reset, rd_gate, sh_gate, fix_all, fix_latch_en, and fix_reset_en are generated in the control unit 2. Further, signals ptx_sh, ptx_rd, pres_b, and psel are also generated in the control unit 2. These signals are used commonly to n+1 row drive units 32. In the following description, although the configuration of the row drive unit 32 on the 0-th row will be mainly described, the row drive units 32 on other rows also have the same configuration.

The first storage unit 320 has an AND circuit 3200, an SR latch 3201, and a D latch 3202. The decoded signal addr(0) output from the address decoder unit 31 is input to one input terminal of the AND circuit 3200. The signal rd_latch_en is input to the other input terminal of the AND circuit 3200. Therefore, a logical product of the decoded signal addr(0) and the signal rd_latch_en is output from the AND circuit 3200 and input to the set terminal S of the SR latch 3201.

Further, the signal rd_reset is input to the reset terminal R of the SR latch 3201. An output signal output from the output terminal Q of the SR latch 3201 is input to the data input terminal D of the D latch 3202. Further, the signal rd_gate is input to the gate input terminal G of the D latch 3202. When both of the decoded signal addr(0) and the signal rd_latch_en are turned to a high level, the SR latch 3201 then stores "1". Subsequently, when the signal rd_gate is turned to a high level, the D latch 3202 then stores "1". The output signal from the output terminal Q of the D latch 3202, that is, a signal lat_rd(0) output from the first storage unit 320 is input to the third storage unit 322 and the pixel drive signal generating unit 323. A signal lat_rd(0) is used in a selection of a row on which a signal from the pixel unit 4 is read out, that is, a selection of a row to perform a readout operation.

The second storage unit 321 has an AND circuit 3210, an SR latch 3211, and a D latch 3212. The decoded signal addr(0) output from the address decoder unit 31 is input to one input terminal of the AND circuit 3210. The signal sh_latch_en is input to the other input terminal of the AND circuit 3210. Therefore, a logical product of the decoded signal addr(0) and the signal sh_latch_en is output from the AND circuit 3210 and input to the set terminal S of the SR latch 3211. Further, the signal sh_reset is input to the reset terminal R of the SR latch 3211. An output signal output from the output terminal Q of the SR latch 3211 is input to the data input terminal D of the D latch 3212. Further, the signal sh_gate is input to the gate input terminal G of the D latch 3212. When both of the decoded signal addr(0) and the signal sh_latch_en are turned to a high level, the SR latch 3211 then stores "1". Subsequently, the signal sh_gate is turned to a high level, the D latch 3212 then stores "1". The output signal from the output terminal Q of the D latch 3212, that is, a signal lat_sh(0) output from the second storage unit 321 is input to the third storage unit 322 and the pixel drive signal generating unit 323. A signal lat_sh(0) is used in a selection of a row on which photoelectric conversion elements PD of the pixels P in the pixel unit 4 are reset and the reset state is then released to enter a charge accumulation state, that is, a selection of a row to perform an electronic shutter operation.

The third storage unit 322 has AND circuits 3220 and 3221, an OR circuit 3222, and an SR latch 3223. The signal lat_rd(0) output from the first storage unit 320 is input to the one input terminal of the AND circuit 3220. The signal fix_latch_en is input to the other input terminal of the AND circuit 3220. Therefore, a logical product of the signal lat_rd(0) and the signal fix_latch_en is output from the AND circuit 3220 and input to one input terminal of the OR circuit 3222. The signal fix_all is input to the other input terminal of the OR circuit 3222. Therefore, a logical sum of the output signal from the AND circuit 3220 and the signal fix_all is output from the OR circuit 3222 and input to the set terminal S of the SR latch 3223. The signal lat_sh(0) output from the second storage unit 321 is input to one input terminal of the AND circuit 3221. The signal fix_reset_en is input to the other input terminal of the AND circuit 3221. Therefore, a logical product of the signal lat_sh(0) and the signal fix_reset_en is output from the AND circuit 3221 and input to the reset terminal R of the SR latch 3223. The output terminal Q of the SR latch 3223, that is, the signal lat_fix(0) output from the third storage unit 322 is input to the pixel drive signal generating unit 323.

This allows the third storage unit 322 to store "1" as a first state in response to the output of the first storage unit 320 being turned to a high level and store "0" as a second state in response to the output of the second storage unit 321 being turned to a high level. Thus, in this configuration, the decoded signal addr(0) is not directly input to the third storage unit 322 from the address decoder unit 31. When the pixel P is neither in a readout operation nor in an electronic shutter operation, the signal lat_fix(0) output from the third storage unit 322 is used as a control signal to the transfer transistor M1 of the pixel P. The transfer transistor M1 is controlled by using the signal lat_fix(0) and thereby the PD is maintained in a charge accumulation state or a reset state.

The pixel drive signal generating unit 323 has an AND circuit 3231, a NAND circuit 3232, and a transfer signal generating unit 3230. The transfer signal generating unit 3230 has a selector 3233, NAND circuits 3234 and 3236, and an OR circuit 3235. The signal lat_rd(0) output from the first storage unit 320, the signal lat_sh(0) output from the second storage unit 321, and the signal lat_fix(0) output from the third storage unit 322 are input to the pixel drive signal generating unit 323. The pixel drive signal generating unit 323 is a combination logic circuit that performs logic operations of these input signals and the signals ptx_sh, ptx_rd, pres_b, and psel. The level shifter 324 is provided in the post-stage of the pixel drive signal generating unit 323. The level shifter 324 is a circuit that converts and outputs a voltage level. A signal whose voltage level has been converted by the level shifter 324 is input to the pixel unit 4.

The signal lat_rd(0) output from the first storage unit 320 is input to one input terminal of the AND circuit 3231. The signal psel is input to the other input terminal of the AND circuit 3231. Therefore, a logical product of the signal lat_rd(0) and the signal psel is output from the AND circuit 3231. This output signal is output to the pixel unit 4 as a signal PSEL(0) via the level shifter 324.

In a similar manner, the signal lat_rd(0) is input to one input terminal of the NAND circuit 3232. The signal pres_b is input to the other input terminal of the NAND circuit 3232. Therefore, an inverted signal of a logical product of the signal lat_rd(0) and the signal pres_b is output from the NAND circuit 3232. This output signal is output to the pixel unit 4 as a signal PRES(0) via the level shifter 324.

The lat_fix(0) output from the third storage unit 322 is input to the first input terminal of the selector 3233. The ptx_sh is input to the second input terminal of the selector 3233. The lat_sh(0) output from the second storage unit 321 is input to the selection control terminal of the selector 3233. The selector 3233 selectively outputs one of the signals of the first input terminal and the second input terminal in accordance with the signal lat_sh(0).

A signal from the output terminal of the selector 3233 is logically inverted and input to one input terminal of the OR circuit 3235. The signal lat_rd(0) is input to the other input terminal of the OR circuit 3235. Therefore, a logical product of an inverted value of the output of the selector 3233 and the signal lat_rd(0) is output from the OR circuit 3235. The signal lat_rd(0) is input to one input terminal of the NAND circuit 3234, and the signal ptx_rd is input to the other input terminal. Therefore, an inverted value of a logical product of the signal lat_rd(0) and the signal ptx_rd is output from the NAND circuit 3234. The output signal of the NAND circuit 3234 is input to one input terminal of the NAND circuit 3236, and the output signal of the OR circuit 3235 is input to the other input terminal. Therefore, an inverted value of a logical product of these signals is output from the NAND circuit 3236. This output signal is output to the pixel unit 4 as a signal PTX(0) via the level shifter 324.

FIG. 4 is a truth table of the transfer signal generating unit 3230 according to the first embodiment. This truth table represents outputs for the values of the signals lat_rd(x) and lat_sh(x). In this table, "1" of the signal lat_rd(x) represents that the associated row is a row to perform a readout from the pixels, and "0" represents that the associated row is a row to perform no readout. Further, "1" of the signal lat_sh(x) represents that the associated row is a row to perform an electronic shutter, and "0" represents that the associated row is a row to perform no electronic shutter.

The transfer signal generating unit 3230 outputs the signal ptx_rd if the signal lat_rd(x) is "1". Further, the transfer signal generating unit 3230 outputs the signal ptx_sh if the signal lat_rd(x) is "0" and the signal lat_sh(x) is "1". Furthermore, the transfer signal generating unit 3230 outputs the signal lat_fix(x) if the signal lat_rd(x) is "0" and the signal lat_sh(x) is "0".

Figure 5:
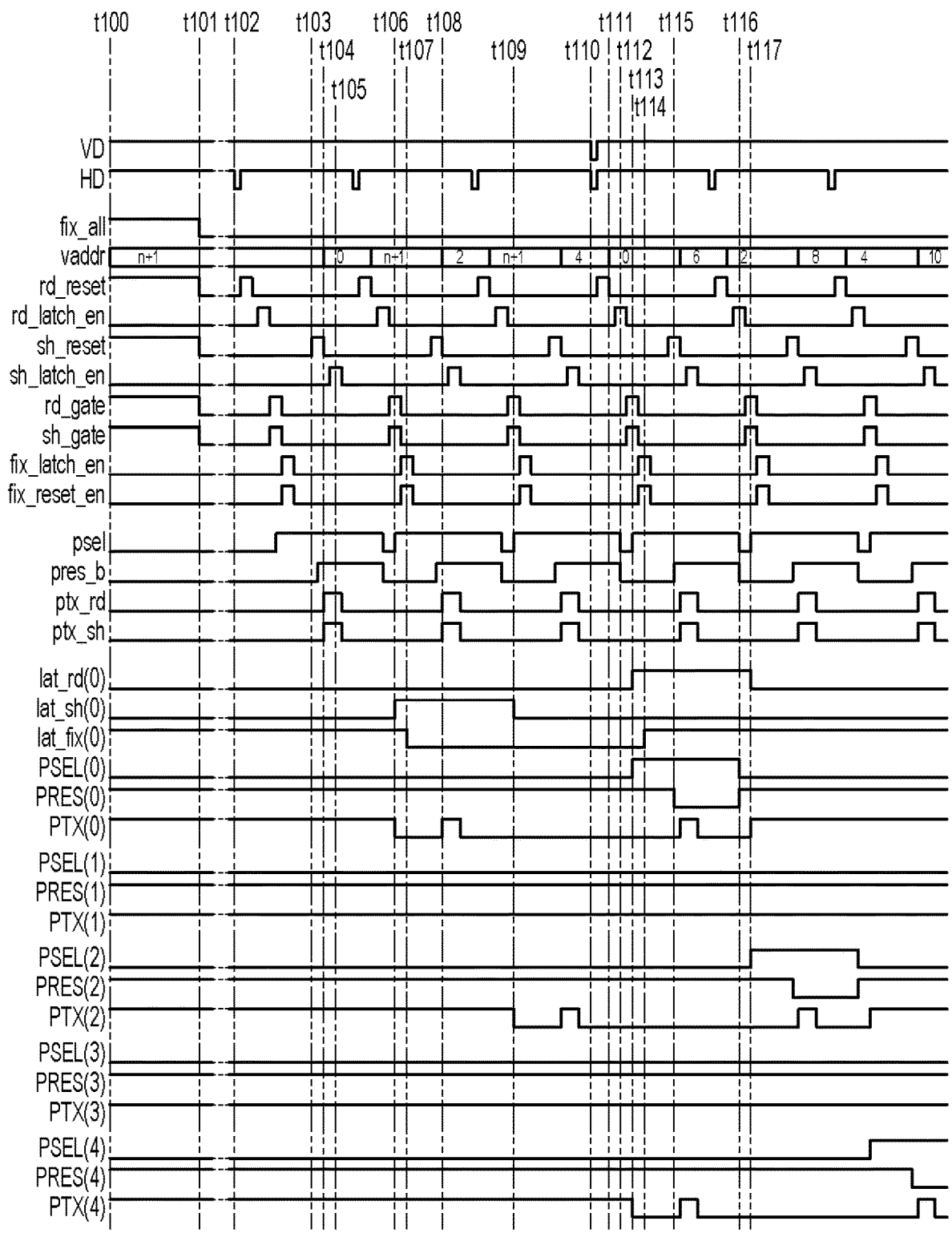
FIG. 5 is a timing chart illustrating a drive method of the vertical scanning unit and a pixel unit according to the first embodiment.

FIG. 5 is a timing chart illustrating a drive method of the vertical scanning unit 3 and the pixel unit 4 according to the first embodiment. In this drive method, an illustrated example is to sequentially perform an electronic shutter scan and a readout scan while omitting every other row of the pixel unit 4. Operations of the vertical scanning unit 3 and the pixel unit 4 will be described below with reference to FIG. 1 to FIG. 5. Note that, with respect to changes in signal levels illustrated in FIG. 5, the description of a portion that is not important for a scan of the pixel unit 4, a portion that would be duplicated, or the like may be omitted.

During a period of the time t100 to t101, an initialization operation of the vertical scanning unit 3 and the pixel unit 4 is performed. In this initialization operation, a drive is performed such that the FDs on all the rows are reset based on the signal fix_all input to the third storage unit 322. First, an initialization operation of the vertical scanning unit 3 will be described with reference to FIG. 3 to FIG. 5.

During a period of the time t100 to t101, the signals fix_all, rd_reset, sh_reset, rd_gate, and sh_gate out of the signals input from the control unit 2 to the vertical scanning unit 3 are high level. Further, the value of the address signal vaddr is "n+1". At this time, all the decoded signals addr(0) to addr(n) output from the address decoder unit 31 are low level. Other signals input from the control unit 2 to the vertical scanning unit 3, that is, all the signals rd_latch_en, sh_latch_en, fix_latch_en, fix_reset_en, psel, pres_b, ptx_rd, and ptx_sh are also low level.

When a high-level signal rd_reset is input to the reset terminal R of the SR latch 3201, the output signal of the SR latch 3201 becomes low level. When the output signal from the SR latch 3201 is input to the data input terminal D of the D latch 3202 and a high-level signal rd_gate is input to the gate input terminal G of the D latch 3202, the output signal of the D latch 3202 becomes low level. Thus, the signals lat_rd(0) to lat_rd(n) output from the first storage unit 320 on respective rows are low level.

In a similar manner, when a high-level signal sh_reset is input to the reset terminal R of the SR latch 3211, the output signal of the SR latch 3211 becomes low level. When the output signal from the SR latch 3211 is input to the data input terminal D of the D latch 3212 and a high-level signal sh_gate is input to the gate input terminal G of the D latch 3212, the output signal of the D latch 3212 becomes low level. Accordingly, the signals lat_sh(0) to lat_sh(n) output from the second storage unit 321 on respective rows are also low level.

When a high-level signal fix_all is input to the OR circuit 3222 of the third storage unit 322, the output signal of the OR circuit 3222 becomes high level regardless of other signals fix_latch_en and lat_rd(0). Further, when a low-level signal fix_reset_en is input to the AND circuit 3221, the output signal of the AND circuit 3221 becomes low level. Since the signal input to the set terminal S of the SR latch 3223 is high level and the signal input to the reset terminal R is low level, the signal lat_fix(0) output from the third storage unit 322 is high level. In a similar manner, the signals lat_fix(1) to lat_fix(n) are also high level.

The signal PSEL(0) is in a low level that is a logical product of a low-level signal lat_rd(0) and a low-level signal psel. The signal PRES(0) is in a high level that is an inverted value of a logical product of a low-level signal lat_rd(0) and a low-level signal pres_b. Both of the signals lat_rd(0) and lat_sh(0) input to the transfer signal generating unit 3230 are low level. Therefore, according to the truth table of FIG. 4, the signal PTX(0) is high level similarly to the signal lat_fix(0). In a similar manner, the signals PSEL(1) to PSEL(n) are low level, the signals PRES(1) to PRES(n) are high level, and the signals PTX(1) to PTX(n) are high level.

Next, an initialization operation of the pixel unit 4 will be described with reference to FIG. 1 and FIG. 2. During a period of the time t100 to t101, the signals PRES(0) to PRES(n) are high level. Therefore, the reset transistor M2 of the pixel P is in a conductive state, and the potential of the FD is initialized in accordance with the potential of the VCC. Furthermore, during the same period, the signals PTX(0) to PTX(n) are also high level. Thus, the transfer transistor M1 of each pixel P is also in a conductive state and thereby charges accumulated in the PD are drained resulting in a reset state of the PD. In such a way, the pixels P on all the rows of the pixel unit 4 are reset.

At the time t101, the signals fix_all, rd_reset, sh_reset, rd_gate, and sh_gate are then turned to a low level. According to the above operations, the initialization of the vertical scanning unit 3 and the pixel unit 4 is completed.

Subsequently, during the time t102 to t109, an electronic shutter operation of pixels P (0, 0) to (m, 0) on the 0-th row is performed.

At the time t102, in response to a low-level pulse of the horizontal synchronous signal HD being input to the control unit 2, the control unit 2 starts control for operations on a row basis.

Around the time t103, the control unit 2 turns the signal sh_reset to a high level and then a low level. This causes the SR latch 3211 to be reset.

At the time t104, when the control unit 2 sets the address signal vaddr to "0", the address decoder unit 31 decodes "0" and turns the decoded signal addr(0) to a high level.

Around the time t105, the control unit 2 turns the signal sh_latch_en to a high level and then a low level. At this time, since both of the signal sh_latch_en and the decoded signal addr(0) input to the AND circuit 3210 are high level, the output of the AND circuit 3210, which is a logical product of these signals, is also high level. This output is input to the set terminal S of the SR latch 3211. Thus, "1" is maintained in the SR latch 3211 and the output signal thereof is high level.

Around the time t106, the control unit 2 turns the signals rd_gate and sh_gate to a high level and then a low level. The D latch 3212 latches a high-level signal being input from the SR latch 3211 to the data input terminal D of the D latch 3212 at a timing when the signal sh_gate input to the gate input terminal G of the D latch 3212 is turned to a high level. As a result, the signal lat_sh(0) output from the second storage unit is turned to a high level. At this time, since the signal lat_sh(0) is high level and the lat_rd(0) is low level, the signal output from the transfer signal generating unit 3230 has the value of the signal ptx_sh, that is, becomes low level. Thus, the signal PTX(0) is turned to a low level, and the reset state of the PD of the pixels P(0, 0) to P(m, 0) on the 0-th row is released.

Around the time t107, the control unit 2 turns the signals fix_latch_en and fix_reset_en to a high level and then a low level. At this time, since the signal lat_rd(0) is low level, the output signal of the OR circuit 3222 is low level regardless of the signal fix_latch_en. Further, since the signal lat_sh(0) is high level, the output signal of the AND circuit 3221 is turned to a high level and then a low level in accordance with the level of the signal fix_reset_en. Therefore, a high-level signal is input to the reset terminal R of the SR latch 3223, and a reset state, that is, the second state "0" is maintained in the SR latch 3223. Thus, the signal lat_fix(0) output from the third storage unit 322 is turned to a low level. At this time, however, since the signal lat_rd(0) is low level and the signal lat_sh(0) is high level, the signal PTX(0) is maintained to the value of the signal ptx_sh, that is, a low level.

At the time t108, the control unit 2 turns the signals ptx_rd and ptx_sh to a high level. At this time, since the signal lat_rd(0) is low level and the signal lat_sh(0) is high level, the signal PTX(0) is turned to a high level because the signal PTX(0) corresponds to the value of the signal ptx_sh. At this time, since the signal PRES(0) being input to the pixels P(0, 0) to P(m, 0) is high level, the reset transistor M2 is in a conductive state. Therefore, the potential of the FD is initialized in accordance with the potential of the VCC. Since the signal PTX(0) is also high level, the transfer transistor M1 is in a conductive state. This causes charges accumulated in the PD to be drained and the PD to be reset. The control unit 2 then turns the values of the signals ptx_rd and ptx_sh to a low level and, in response to the signal PTX(0) being again turned to a low level, each transfer transistor M1 of the pixels P(0, 0) to P(m, 0) is switched into a non-conductive state. Thereby, the reset state of the PD is released resulting in a charge accumulation state of the PD.

Further, immediately before the time t108, the control unit 2 turns the signal sh_reset to a high level and then a low level, and this operation causes the SR latch 3211 to be reset. Then, at the time t108, the control unit 2 sets the address signal vaddr to "2". At this time, since the address decoder unit 31 turns the decoded signal addr(0) to a low level, the SR latch 3211 holds "0".

Around the time t109, the control unit 2 turns the signals rd_gate and sh_gate to a high level and then a low level. Since the D latch 3212 latches the low-level output signal from the SR latch 3211, the signal lat_sh(0), which is the output signal of the second storage unit 321, is turned to a low level. Since the signal lat_sh(0) is low level and the signal lat_rd(0) is also low level, the transfer signal generating unit 3230 outputs the value of the signal lat_fix(0), that is, a low level. Thus, the signal PTX(0) remains in a low level, and each PD of the pixels P(0, 0) to P(m, 0) maintains a charge accumulation state.

In this way, an electronic shutter operation of the pixels P(0, 0) to P(m, 0) is completed. Subsequently, similar operations are repeated until the address signal vaddr becomes "n", and the electronic shutter scanning is then completed. Note that, in the pixels P(0, 1) to P(m, 1), P(0, 3) to P(m, 3), . . . on the first row, the third row, . . . , which have been omitted at the electronic shutter scanning, a state of an initialization operation of the pixel unit 4 at the time t100 is maintained.

Subsequently, during a period of the time t110 to t117, a readout operation of the pixels P(0, 0) to P(m, 0) on the 0-th row is performed.

At the time t110, in response to a low-level pulse of the vertical synchronous signal VD being input to the control unit 2, the control unit 2 starts control for a readout operation. A readout operation is the same as an electric shutter operation in that the control unit 2 starts control for operations on a row basis each time the horizontal synchronous signal HD is input.

Immediately before the time t111, the control unit 2 turns the signal rd_reset to a high level and then a low level. This causes the SR latch 3201 to be reset. Further, at the time t111, when the control unit 2 sets the address signal vaddr to "0", the address decoder unit 31 decodes "0" and sets the decoded signal addr(0) to a high level.

Around the time t112, the control unit 2 turns the signal rd_latch_en to a high level and then a low level. At this time, since both of the signal rd_latch_en and the decoded signal addr(0) input to the AND circuit 3200 become high level, the output of the AND circuit 3200, which is a logical product of these signals, is also high level. This output is input to the set terminal S of the SR latch 3201. Thus, "1" is held in the SR latch 3201, and the output signal thereof is high level.

Around the time t113, the control unit 2 turns the signals rd_gate and sh_gate to a high level and then a low level. The D latch 3202 latches the high-level signal being input to the data input terminal D of the D lath 3202 from the SR latch 3201 at the timing when the signal rd_gate input to the gate input terminal G of the D latch 3202 is turned to a high level. As a result, the signal lat_rd(0) output from the first storage unit 320 is turned to a high level.

Further, at the time t113, the signal psel is turned to a high level. At this time, since both of the signal lat_rd(0) and the signal psel input to the AND circuit 3231 are high level, the output of the AND circuit 3231, which is a logical product thereof, is also high level and the signal PSEL(0) is turned to a high level. This causes each selection transistor M4 of the pixels P(0, 0) to P(m, 0) on the 0-th row to be in a conductive state and these pixels to be in a selected state. Furthermore, since the signal lat_rd(0) input to the transfer signal generating unit 3230 is high level, the output of the transfer signal generating unit 3230 has the value of the signal ptx_rd, that is, becomes low level. Thus, the signal PTX(0) is maintained to a low level.

Around the time t114, the control unit 2 turns the signals fix_latch_en and fix_reset_en to a high level and then a low level. At this time, since the signal lat_rd(0) is high level, the output single of the OR circuit 3222 is turned to a high level and then a low level in accordance with the level of the signal fix_latch_en. Since the signal lat_sh(0) is low level, the output signal of the AND circuit 3221 is low level. Therefore, a high-level signal is input to the set terminal S of the SR latch 3223, and a set state, that is, the first state "1" is held in the SR latch 3223. Thus, the signal lat_fix(0) output from the third storage unit 322 is turned to a high level.

At the time t115, the control unit 2 turns the signal pres_b to a high level. At this time, since the signal lat_rd(0) is high level, the signal PRES(0), which is an inverted value of a logical produce thereof, is turned to a low level. When the signal PRES(0) is turned to a low level, each reset transistor M2 of the pixel P(0, 0) to P(m, 0) is switched into a non-conductive state and the FD is held in a floating state. At this time, the amplification transistor M3 and a constant current source (not illustrated) operate as a source follower. Since charges accumulated in the PD have not yet been transferred to the FD, a noise signal (N signal) due to the FD and the amplification transistor M3 appears on the vertical output lines Vline(0) to Vline(m).

Subsequently, the control unit 2 turns the signals ptx_rd and ptx_sh to a high level and then a low level. At this time, since the signal lat_rd(0) is high level, the signal PTX(0) is turned to a high level. This causes each transfer transistor M1 of the pixel P(0, 0) to P(m, 0) to be in a conductive state, and charges generated and accumulated in the PD are transferred to the FD. Subsequently, the signal PTX(0) is turned to a low level and the transfer transistor M1 is switched to a non-conductive state and thereby transfer of charges accumulated in the PD to the FD is completed. Then, the amplification transistor M3 and a constant current source (not illustrated) operate as a source follower, and a pixel signal (S signal) in accordance with charges held in the FD is output to each of the vertical output lines Vline(0) to Vline(m).

Immediately before the time t116, the control unit 2 turns the signal rd_reset to a high level and then a low level. This operation causes the SR latch 3201 to be reset. The control unit 2 then sets the address signal vaddr to "2". At this time, since the address decoder unit 31 turns the decoded signal addr(0) to a low level, the SR latch 3201 holds "0".

At the time t116, the control unit 2 turns the signals pres_b and psel to a low level. The signal PRES(0) is turned to a high level, which causes each reset transistor M2 of the pixels P(0, 0) to P(m, 0) to be in a conductive state and the FDs to be in a reset state. Further, the signal PSEL(0) is turned to a low level, which causes the selection transistors M4 to be in a non-conductive state and the pixels P(0, 0) to P(m, 0) to be in a non-selected state.

Around the time t117, the control unit 2 turns the signals rd_gate and sh_gate to a high level and then a low level. Since the D latch 3202 latches the low-level output signal from the SR latch 3201, the signal lat_rd(0), which is the output signal of the first storage unit 320, is turned to a low level. Since the signal lat_rd(0) is low level and the signal lat_sh(0) is also low level, the transfer signal generating unit 3230 outputs the value of the signal lat_fix(0), that is, a high level. Thus, the signal PTX(0) is turned to a high level, which causes the transfer transistors M1 of the pixels P(0, 0) to P(m, 0) to be in a conductive state and the PDs to be again in a state where a reset state is maintained.

In this way, a readout operation of the pixels P(0, 0) to P(m, 0) is completed. Subsequently, similar operations are repeated until the address signal vaddr becomes "n", and the readout scanning is then completed.

According to the present embodiment, the vertical scanning unit 3 can write the first state "1" in the third storage unit 322 by using the output of the first storage unit 320 and write the second state "0" in the third storage unit 322 by using the output of the second storage unit 321. Thus, in the present embodiment, there is no need for acquiring address values in a time-division manner from the address decoder unit 31 in order to write the state values to the third storage unit as seen in Japanese Patent Application Laid-open No. 2011-244329, which allows for a more simplified drive method.

Further, in the present embodiment, since the electronic shutter operation is performed only on the rows corresponding to rows to be read out, an initialized state of the pixels is maintained on the omitted rows. This can reduce a noise that would otherwise be generated depending on the number of rows on which the electronic shutter operation is together operated.

Second Embodiment

Next, an imaging device according to a second embodiment of the present invention will be described mainly for features different from those of the first embodiment.

The imaging device according to the present embodiment is different from the first embodiment in the configuration of the vertical scanning unit.

Figure 6:
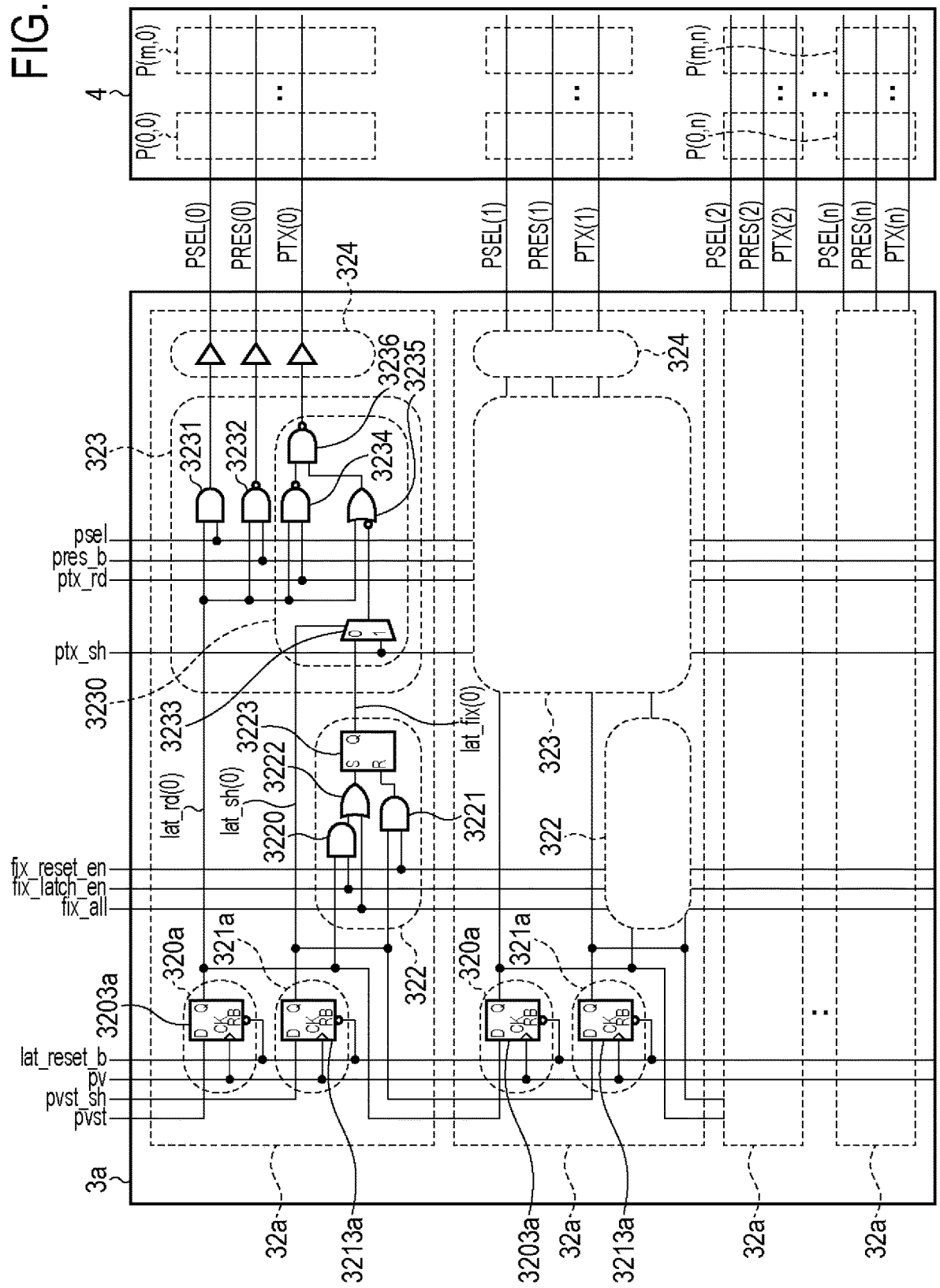
FIG. 6 is a block diagram of a vertical scanning unit according to a second embodiment.

FIG. 6 is a block diagram of a vertical scanning unit 3a according to the present embodiment. In the present embodiment, the vertical scanning unit 3a, which corresponds to the vertical scanning unit 3 of the first embodiment, does not have the address decoder unit 31. Instead, the vertical scanning unit 3a forms a shift register with a first storage unit 320a and a second storage unit 321a each having a D-flip-flop (hereafter, referred to as "D-FF"). In the present embodiment, the control unit 2 is different from the first embodiment in that the control unit 2 outputs, to the vertical scanning unit 3a, signals pv and lat_reset_b used commonly to row driver units 32a on respective rows and signals pvst and pvst_sh input to the row driver unit 32a on the top row.

The first storage unit 320a has a D-FF 3203a. The signal pv is input to the clock input terminal CK of the D-FF 3203a on each row. The signal pv is used as a shift pulse of the shift register. The signal pvst is input to the data input terminal D of the D-FF 3203a on the top row (that is, the 0-th row). The signal lat_reset_b is input to the asynchronous reset terminal RB of the D-FF 3203a on each row. The signal lat_rd(0) is output from the output terminal Q of the D-FF 3203a on the top row and input to the data input terminal D of the D-FF 3203a of the first storage unit 320a arranged on the next row (that is, the first row). In a similar manner, the signal lat_rd(1), which is the output signal of the D-FF 3203a on the first row, is input to the data input terminal D of the D-FF 3203a of the first storage unit 320a on the next row (that is, the second row). In such a way, the output and the input of the D-FF 3203a of the first storage unit 320a are sequentially connected from the 0-th row to the n-th row, and thereby a shift register is configured. This shift register performs a readout scan by using the signal pv, which is a shift pulse, to sequentially shift a high-level pulse of the signal pvst to the first storage unit 320a on the subsequent row.

The second storage unit 321a has a D-FF 3213a. The signal pv is input to the clock input terminal CK of the D-FF 3213a on each row. The signal pv is used as a shift pulse of the shift register. The signal pvst_sh is input to the data input terminal D of the D-FF 3213a on the top row (that is, the 0-th row). The signal lat_reset_b is input to the asynchronous reset terminal RB of the D-FF 3213a on each row. The signal lat_sh(0) is output from the output terminal Q of the D-FF 3213a on the top row and input to the data input terminal D of the D-FF 3213a of the second storage unit 321a arranged on the next row (that is, the first row). In a similar manner, the signal lat_sh(1), which is the output signal of the D-FF 3213a on the first row, is input to the data input terminal D of the D-FF 3213a of the second storage unit 321a on the next row (that is, the second row). In such a way, the output and the input of the D-FF 3213a of the second storage unit 321a are sequentially connected from the 0-th row to the n-th row, and thereby a shift register is configured. This shift register performs a shutter scan by using the signal pv, which is a shift pulse, to sequentially shift a high-level pulse of the signal pvst_sh to the second storage unit 321a on the subsequent row.

Figure 7:
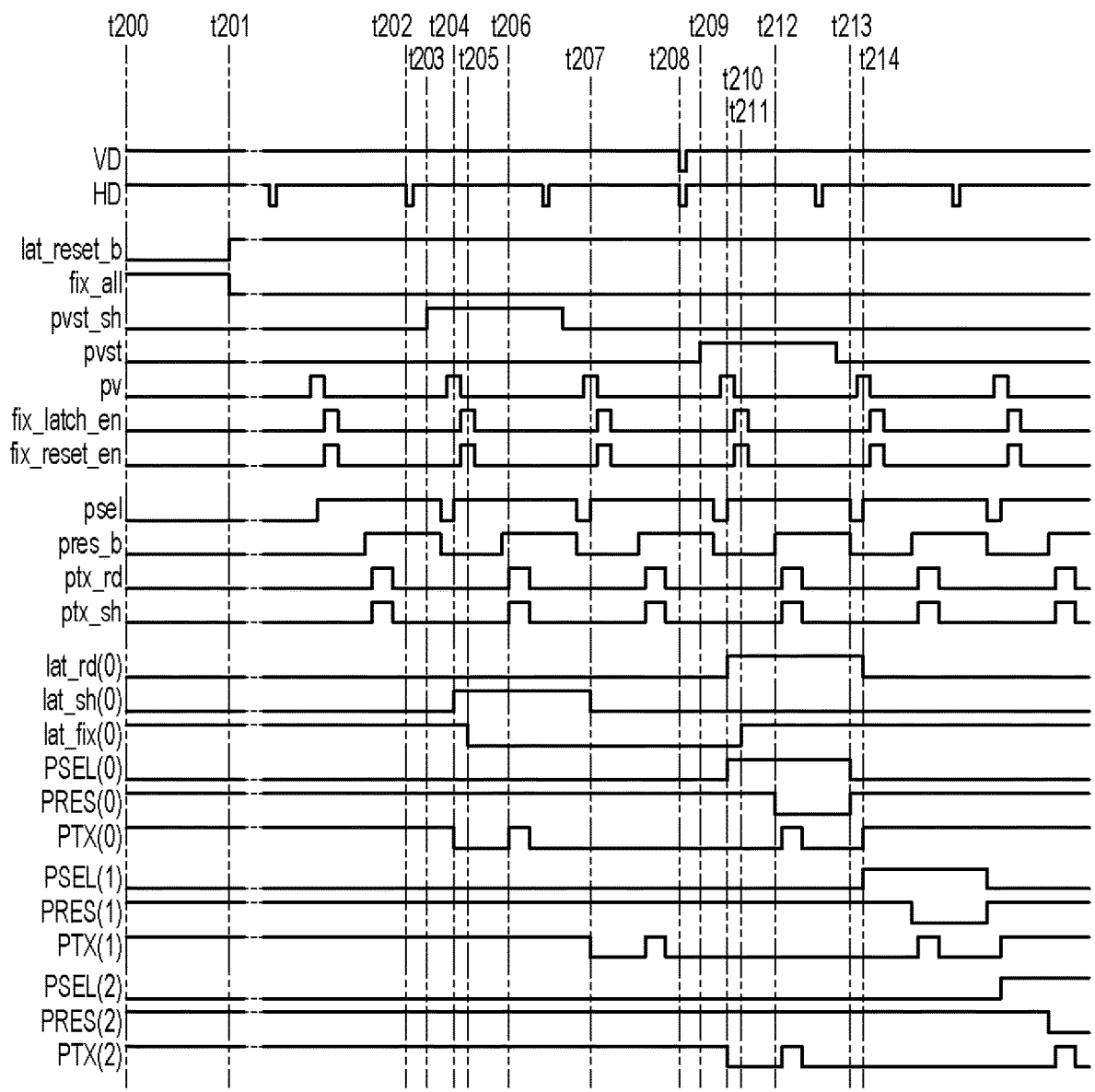
FIG. 7 is a timing chart illustrating a drive method of the vertical scanning unit and a pixel unit according to the second embodiment.

FIG. 7 is a timing chart illustrating a drive method of the vertical scanning unit 3a and the pixel unit 4 according to the second embodiment. In the present drive method, an electronic shutter scan and a readout scan are sequentially performed from the 0-th row including the pixels P(0, 0) to P(m, 0). Operations of the vertical scanning unit 3a and the pixel unit 4 will be described below with reference to FIG. 6 and FIG. 7 mainly for features different from those in the first embodiment.

During a period of the time t200 to t201, an initializing operation of the vertical scanning unit 3a and the pixel unit 4 is performed. During a period of the time t200 to t201, the signal fix_all out of the signals input to the vertical scanning unit 3a from the control unit 2 is high level. Further, all the signals lat_reset_b, pvst_sh, pvst, pv, fix_latch_en, fix_reset_en, psel, pres_b, ptx_rd, and ptx_sh are low level.

In response to the low-level signal lat_reset_b being input to the asynchronous reset terminal RB of the D-FF 3203a of the first storage unit 320a on each row, the output signal of the D-FF 3203a on each row is turned to a low level. That is, the signals lat_rd(0) to lat_rd(n), which are the output signals of the first storage unit 320a, are turned to a low level.

In a similar manner, in response to a low-level signal lat_reset_b being input to the asynchronous reset terminal RB of the D-FF 3213a of the second storage unit 321a on each row, the output signal of the D-FF 3213a on each row is turned to a low level. That is, the signals lat_sh(0) to lat_sh(n), which are the output signals of the second storage unit 321a, are also turned to a low level.

Since the operations of the third storage unit 322 and the pixel drive signal generating unit 323 are the same as those in the first embodiment, the description of these operations will be omitted. The initialization operation of the pixel unit 4 is also performed in the same manner as that in the first embodiment, and the pixels P on all the rows of the pixel unit 4 are reset. Then, at the time t201, the signal lat_reset_b is turned to a high level and the signal fix_all is turned to a low level. According to the above operation, the initialization of the vertical scanning unit 3a and the pixel unit 4 is completed.

Subsequently, during the time t202 to t207, an electronic shutter operation of the pixels P(0, 0) to P(m, 0) on the 0-th row is performed.

At the time t202, in response to a low-level pulse of the horizontal synchronous signal HD being input to the control unit 2, the control unit 2 starts control for operations on a row basis.

At the time t203, the control unit 2 turns the signal pvst_sh to a high level. This results in a state where a high-level signal is input to the data input terminal D of the D-FF 3213a on the 0-th row.

Around the time t204, the control unit 2 turns the signal pv to a high level and then a low level. The D-FF 3213a holds "1" due to the high-level signal pvst_sh being input to the data input terminal D at the rising edge of the signal pv, and the output signal thereof is high level. At this time, since the signal lat_sh(0) is high level and the signal lat_rd(0) is low level, the signal output from the transfer signal generating unit 3230 has the value of the signal ptx_sh, that is, a low level. Thus, the signal PTX(0) is turned to a low level, and the reset state of each PD of the pixels P(0, 0) to P(m, 0) on the 0-th row is released.

Around the time t205, the control unit 2 turns the signals fix_latch_en and fix_reset_en to a high level and then a low level. At this time, since the signal lat_rd(0) is low level, the output signal of the OR circuit 3222 is low level regardless of the signal fix_latch_en. Further, since the signal lat_sh(0) is high level, the output signal of the AND circuit 3221 is turned to a high level and then a low level in accordance with the level of the signal fix_reset_en. Therefore, a high-level signal is input to the reset terminal R of the SR latch 3223, and a reset state, that is, the second state "0" is held in the SR latch 3223. Thus, the signal lat_fix(0) output from the third storage unit 322 is turned to a low level. At this time, since the signal lat_rd(0) is low level and the signal lat_sh(0) is high level, the signal PTX(0) is maintained to the value of the signal ptx_sh, that is, a low level.

At the time t206, since the signal lat_sh(0) is high level, the value of the signal ptx_sh is output and the signal PTX(0) is turned to a high level. At this time, in each of the pixels P(0, 0) to P(m, 0), since the signal PRES(0) is high level, the reset transistor M2 is switched to a conductive state, and the potential of the FD is initialized in accordance with the potential of the VCC. Further, since the signal PTX(0) is also high level, the transfer transistor M1 is switched to a conductive state. This causes charges accumulated in the PD to be drained and the PD to be reset. Then, when the value of the signal ptx_sh is turned to a low level and the signal PTX(0) is turned to a low level, the transfer transistor M1 is switched to a non-conductive state and the PD reset state is released to enter a charge accumulation state in each of the pixels P(0, 0) to P(m, 0).

Around the time t207, the control unit 2 then turns the signal pv to a high level and then a low level. The signal pvst_sh is low level immediately before the time t207. Therefore, in the D-FF 3213a on the 0-th row that drives the pixels P(0, 0) to P(m, 0), the signal lat_sh(0) is turned to a low level due to the low-level signal pvst_sh being input to the data input terminal D at the rising edge of the signal pv. On the other hand, in the D-FF 3213a on the first row that drives the pixels P(0, 1) to P(m, 1), the signal lat_sh(1) is high level due to the high-level signal lat_sh(0) in the previous state being input to the data input terminal D at the rising edge of the signal pv. In such a way, the D-FF 3213a of the second storage unit 321a performs a shift operation with a trigger of the signal pv.

Since the signal lat_sh(0) is low level and the signal lat_rd(0) is low level, the transfer signal generating unit 3230 outputs the value of the signal lat_fix(0), that is, a low level. Thus, the signal PTX(0) remains in a low level, and a charge accumulation state of each PD of the pixels P(0, 0) to P(m, 0) is maintained.

In this way, an electronic shutter operation of the pixels P(0, 0) to P(m, 0) on the 0-th row is completed. Subsequently, similar operations are repeated up to the n-th row and thereby an electronic shutter scanning is completed.

Subsequently, during the time t208 to t214, a readout operation of the pixels P(0, 0) to P(m, 0) on the 0-th row is performed.

At the time t208, in response to a low-level pulse of the vertical synchronous signal VD being input to the control unit 2, the control unit 2 starts control for a readout operation.

At the time t209, the control unit 2 turns the signal pvst to a high level. This results in a state where a high-level signal is input to the data input terminal D of the D-FF 3203a on the 0-th row.

At the time t210, the control unit 2 turns the signal pv to a high level and then a low level. The D-FF 3203a holds "1" due to the high-level signal pvst being input to the data input terminal D at the rising edge of the signal pv, and thus the signal lat_rd(0), which is the output signal thereof, is turned to a high level.

Further, at the time t210, the signal psel is turned to a high level. At this time, since both of the signal lat_rd(0) and the signal psel input to the AND circuit 3231 are high level, the output of the AND circuit 3231, which is a logical product of these signals, is also high level, and thus the signal PSEL(0) is turned to a high level. This causes the selection transistors M4 of the pixels P(0, 0) to P(m, 0) on the 0-th row to be in a conductive state resulting in a selected state of these pixels. Furthermore, since the signal lat_rd(0) input to the transfer signal generating unit 3230 is high level, the transfer signal generating unit 3230 outputs the value of the signal ptx_rd, that is, a low level. Thus, the signal PTX(0) is maintained to a low level.

Around the time t211, the control unit 2 turns the signals fix_latch_en and fix_reset_en to a high level and then a low level. At this time, since the signal lat_rd(0) is high level, the output signal of the OR circuit 3222 is turned to a high level and then a low level in accordance with the level of the signal fix_latch_en. Since the signal lat_sh(0) is low level, the output signal of the AND circuit 3221 is low level. Therefore, a high-level signal is input to the set terminal S of the SR latch 3223, and a set state, that is, the first state "1" is held in the SR latch 3223. Thus, the signal lat_fix(0) output from the third storage unit 322 is turned to a high level.

During a period of the time t212 to t213, a readout of a noise signal of the pixels P(0, 0) to P(m, 0) on the 0-th row, transfer of charges accumulated in the PDs to the FDs, and the readout of pixel signals in accordance with charges held in the FDs are performed in a similar manner to the first embodiment.

Then, around the time t214, the control unit 2 turns the signal pv to a high level and then a low level. The signal pvst is turned to a low level immediately before the time t213 that is before the time t214. Therefore, in the D-FF 3203a on the 0-th row that drives the pixels P(0, 0) to P(m, 0), the signal lat_rd(0) is turned to a low level due to the low-level signal pvst being input to the data input terminal D at the rising edge of the signal pv. On the other hand, in the D-FF 3203a on the first row that drives the pixels P(0, 1) to P(m, 1), the signal lat_rd(1) is high level due to the high-level signal in the previous state of the signal lat_rd(0) being input to the data input terminal D at the rising edge of the signal pv. In such a way, the D-FF 3203a of the first storage unit 320a performs a shift operation with a trigger of the signal pv.

Since the signal lat_rd(0) is low level and the signal lat_sh(0) is also low level, the transfer signal generating unit 3230 outputs the value of the signal lat_fix(0), that is, a high level. Thus, the signal PTX(0) is turned to a high level, each transfer transistor M1 of the pixels P(0, 0) to P(m, 0) is switched to a conductive state, and the PDs again enter a state where a reset state is maintained.

In this way, a readout operation of the pixels P(0, 0) to P(m, 0) on the 0-th row is completed. Subsequently, similar operations are repeated up to the n-th row and thereby the readout scan is completed.

According to the present embodiment, since the vertical scanning unit 3a forms a shift register by using the first storage unit 320a and the second storage unit 321a, no address decoder unit is used. This eliminates an operation of generating an address values in a time-division manner in the address decoder unit in a readout scan and a shutter scan, which allows for a more simplified drive method than in the first embodiment.

Note that, although the signal lat_rd(0) output from the D-FF 3203a on each row is input to the D-FF 3203a arranged on the next row in the present embodiment, the signal lat_rd(0) is not required to input to the next row but may be input to any of the different rows. The same applies to the signal lat_sh(0) output from the D-FF 3213a. Further, the row to which the signal pvst is input may not be the top row. That is, the order of a shutter scan and a readout scan can be properly changed.

Third Embodiment

Next, an imaging device according to the third embodiment of the present invention will be described mainly for features different from those in the first and second embodiments.

The imaging device according to the present embodiment is different from the first and second embodiments in the configurations of the vertical scanning unit and the pixel unit.

Figure 8:
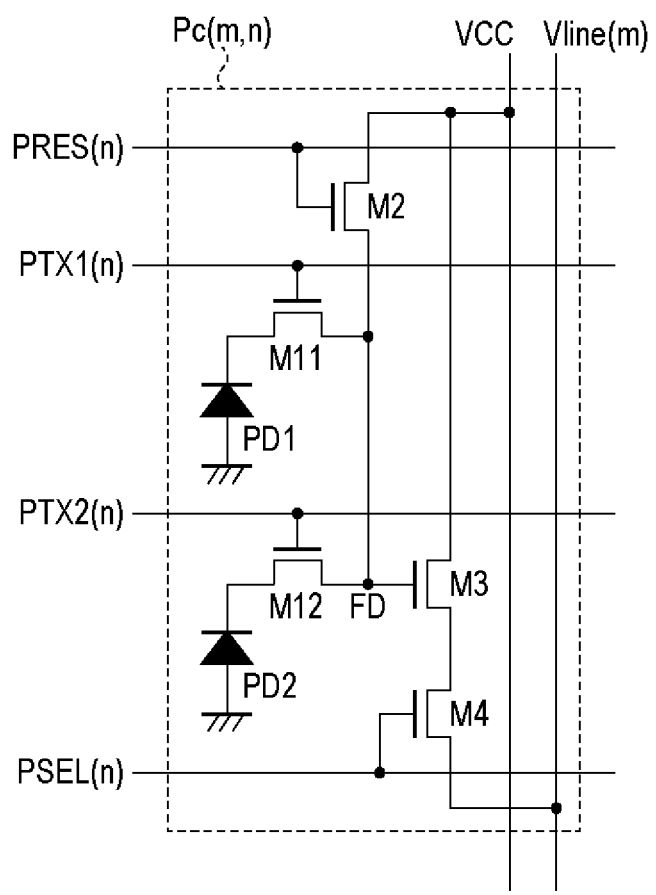
FIG. 8 is a circuit diagram of a pixel according to a third embodiment.

FIG. 8 is a circuit diagram of a pixel Pc of the pixel unit 4 according to the present embodiment. The pixel Pc(m, n) represents a pixel arranged at the n-th row and the m-th column of a pixel unit 4c. The pixel Pc of the present embodiment is different from that of the first embodiment in that two photodiodes (hereafter, denoted as "PD1" and "PD2") share one FD. The pixel Pc has the PD1, the PD2 and the transfer transistors M11 and M12 instead of the PD and the transfer transistor M1 of the first embodiment. Charges accumulated in the PD1 are transferred to the FD via the transfer transistor M11. Charges accumulated in the PD2 are transferred to the FD via the transfer transistor M12. A signal PTX1(n) is a signal that controls the transfer transistor M11 connected to the PD1 on the n-th row and input to the gate of the transfer transistor M11. A signal PTX2(n) is a signal that controls the transfer transistor M12 connected to the PD2 on the n-th row and input to the gate of the transfer transistor M12.

Note that, although an example in which two photodiodes share one FD is illustrated in the present embodiment, the embodiment is not limited thereto, and the number of photodiodes that share a floating diffusion may be three or more. In other words, the pixel Pc may have a plurality of photodiodes that share one FD.

Figure 9:
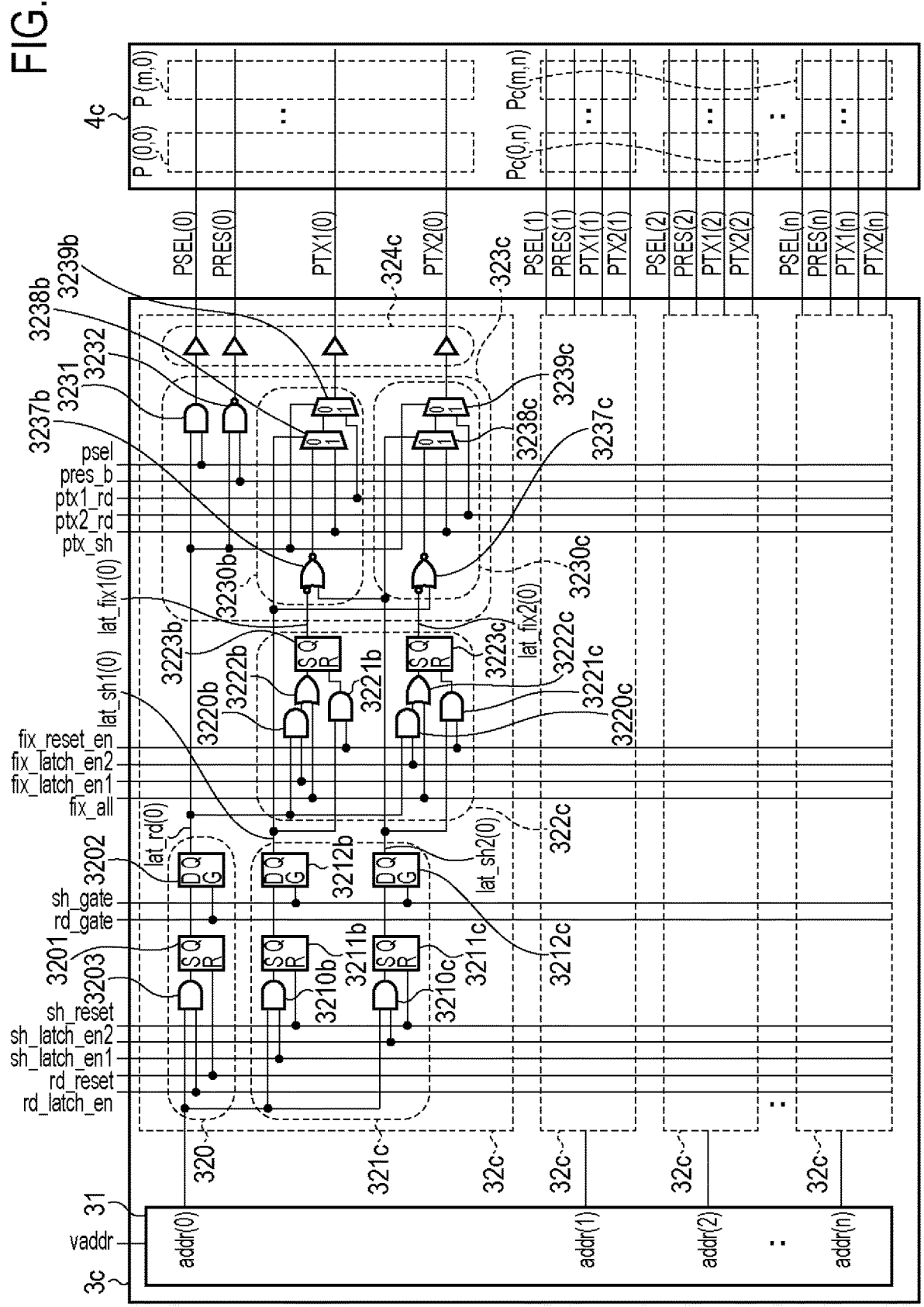
FIG. 9 is a block diagram of a vertical scanning unit according to the third embodiment.

FIG. 9 is a block diagram illustrating the vertical scanning unit 3c according to the present embodiment. The vertical scanning unit 3c of the present embodiment is different from the vertical scanning unit 3 of the first embodiment mainly in the configurations of a second storage unit 321c, a third storage unit 322c, and a pixel drive signal generating unit 323c. Note that the control unit 2 of the present embodiment outputs signals sh_latch_en1 and sh_latch_en2 instead of the signal sh_latch_en of the first embodiment to the vertical scanning unit 3c. In a similar manner, the signal fix_latch_en of the first embodiment corresponds to signals fix_latch_en1 and fix_latch_en2 in the present embodiment, and the signal ptx_rd of the first embodiment corresponds to signals ptx1_rd and ptx2_rd in the present embodiment.

The second storage unit 321c has AND circuits 3210b and 3210c, SR latches 3211b and 3211c, and D latches 3212b and 3212c. The AND circuit 3210b, the SR latch 3211b, and the D latch 3212b form a first storage circuit, and the AND circuit 3210c, the SR latch 3211c, and the D latch 3212c form a second storage circuit. That is, the second storage unit 321c has two sets of storage circuits. The configuration and connection relationship of each storage circuit is substantially the same as the second storage unit 321 of the first embodiment, and thus the description thereof will be omitted.

The first storage circuit stores "1" when a logical product of the decoded signal addr(0) output from the address decoder unit 31 and the signal sh_latch_en1 is high level. Then, once the signal lat_sh1(0), which is the output signal of the first storage circuit, is turned to "1", an electronic shutter operation of the PD1 is performed. The second storage circuit stores "1" when a logical product of the decoded signal addr(0) output from the address decoder unit 31 and the signal sh_latch_en2 is high level. Then, once the signal lat_sh2(0), which is the output signal of the second storage circuit, is turned to "1", an electronic shutter operation of the PD2 is performed.

The third storage unit 322c has AND circuits 3220b, 3220c, 3221b, and 3221c, OR circuits 3222b and 3222c, and SR latches 3223b and 3223c. The AND circuits 3220b and 3221b, the OR circuit 3222b, and the SR latch 3223b form a third storage circuit, and the AND circuits 3220c and 3221c, the OR circuit 3222c, and the SR latch 3223c form a fourth storage circuit. That is, the third storage unit 322c has two sets of storage circuits. The configuration and connection relationship of each storage circuit is substantially the same as the third storage unit 322 of the first embodiment, and thus the description thereof will be omitted.

The AND circuit 3220b and the OR circuit 3222b input, to the set terminal S of the SR latch 3223b, a logical sum of the signal fix_all and a signal of a logical product of the signal lat_rd(0), which is the output signal of the first storage unit 320, and the signal fix_latch_en1. The AND circuit 3221b inputs a logical product of the signal lat_sh1(0) and the signal fix_reset_en to the reset terminal R of the SR latch 3223b.

This allows the SR latch 3223b of the third storage unit 322c to hold "1" as the first state when the output of the first storage unit 320 becomes high level and to hold "0" as the second state when the output of the D latch 3212b of the second storage unit 321c becomes high level. When the PD1 is neither in a state of performing a readout operation nor in a state of performing an electronic shutter operation, the signal lat_fix1(0), which is the output signal of the SR larch 3223b, is used as a control signal of the transfer transistor M11.

In a similar manner, the AND circuit 3220c and the OR circuit 3222c input, to the set terminal S of the SR latch 3223c, a logical sum of the signal fix_all and a signal of a logical product of the signal lat_rd(0) and the signal fix_latch_en2. The AND circuit 3221c inputs a logical product of the signal lat_sh2(0) and the signal fix_reset_en to the reset terminal R of the SR latch 3223c.

This allows the SR latch 3223c of the third storage unit 322c to hold "1" as the first state when the output of the first storage unit 320 becomes high level and to hold "0" as the second state when the output of the D latch 3212c of the second storage unit 321c becomes high level. When the PD2 is neither in a state of performing a readout operation nor in a state of performing an electronic shutter operation, the signal lat_fix2(0), which is the output signal of the SR larch 3223c, is used as a control signal of the transfer transistor M12.

The pixel drive signal generating unit 323c has an AND circuit 3231, a NAND circuit 3232, and transfer signal generating units 3230b and 3230c. The configurations and connection relationships of the AND circuit 3231 and the NAND circuit 3232 are the same as those of the first embodiment, and thus the description thereof will be omitted. The transfer signal generating unit 3230b has a NOR circuit 3237b and selectors 3238b and 3239b. The transfer signal generating unit 3230c has a NOR circuit 3237c and selectors 3238c and 3239c.

The signal lat_fix1(0) is logically inverted and input to one input terminal of the NOR circuit 3237b. The signal lat_sh2(0) is input to the other input terminal of the NOR circuit 3237b. The NOR circuit 3237b outputs an inverted value of the logical sum of these signals to the first input terminal of the selector 3238b. The signal ptx_sh is input to the second input terminal of the selector 3238b. The lat_sh1(0) is input to the selection control terminal of the selector 3238b. The selector 3238b selectively outputs, to the first input terminal of the selector 3239b, one of the signals of the first input terminal and the second input terminal in accordance with the signal lat_sh1(0).

The signal ptx1_rd is input to the second input terminal of the selector 3239b. The lat_rd(0) is input to the selection control terminal of the selector 3239b. The selector 3239b selectively outputs one of the signals of the first input terminal and the second input terminal in accordance with the signal lat_rd(0). This output signal is output to the pixel unit 4c as the signal PTX1(0) via the level shifter 324c.

The signal lat_fix2(0) is logically inverted and input to one input terminal of the NOR circuit 3237c. The signal lat_sh1(0) is input to the other input terminal of the NOR circuit 3237c. The NOR circuit 3237c outputs an inverted value of a logical sum of these signals to the first input terminal of the selector 3238c. The signal ptx_sh is input to the second input terminal of the selector 3238c. The signal lat_sh2(0) is input to the selection control terminal of the selector 3238c. The selector 3238c selectively outputs, to the first input terminal of the selector 3239c, one of the signals of the first input terminal and the second input terminal in accordance with the signal lat_sh2(0).

The signal ptx2_rd is input to the second input terminal of the selector 3239c. The signal lat_rd(0) is input to the selection control terminal of the selector 3239c. The selector 3239c selectively outputs one of the signals of the first input terminal and the second input terminal in accordance with the signal lat_rd(0). This output signal is output to the pixel unit 4c as the signal PTX2(0) via the level shifter 324c.

FIG. 10A is a truth table of the transfer signal generating unit 3230b according to the third embodiment, and FIG. 10B is a truth table of the transfer signal generating unit 3230c according to the third embodiment.

According to FIG. 10A, the transfer signal generating unit 3230b outputs the signal ptx1_rd if the signal lat_rd(x) is "1". Further, the transfer signal generating unit 3230b outputs the signal ptx_sh if the signal lat_rd(x) is "0" and the signal lat_sh1(x) is "1". If the signal lat_rd(x) is "0" and the signal lat_sh1(x) is "0", the transfer signal generating unit 3230b outputs the signal lat_fix1(x) if the signal lat_sh2(x) is "0" and outputs a low level if the signal lat_sh2(x) is "1".

In a similar manner, according to FIG. 10B, the transfer signal generating unit 3230c outputs the signal ptx2_rd if the signal lat_rd(x) is "1". Further, the transfer signal generating unit 3230c outputs the signal ptx_sh if the signal lat_rd(x) is "0" and the signal lat_sh2(x) is "1". If the signal lat_rd (x) is "0" and the signal lat_sh2(x) is "0", the transfer signal generating unit 3230c outputs the signal lat_fix2(x) if the signal lat_sh1(x) is "0" and outputs a low level if the signal lat_sh1(x) is "1".

Figure 11:
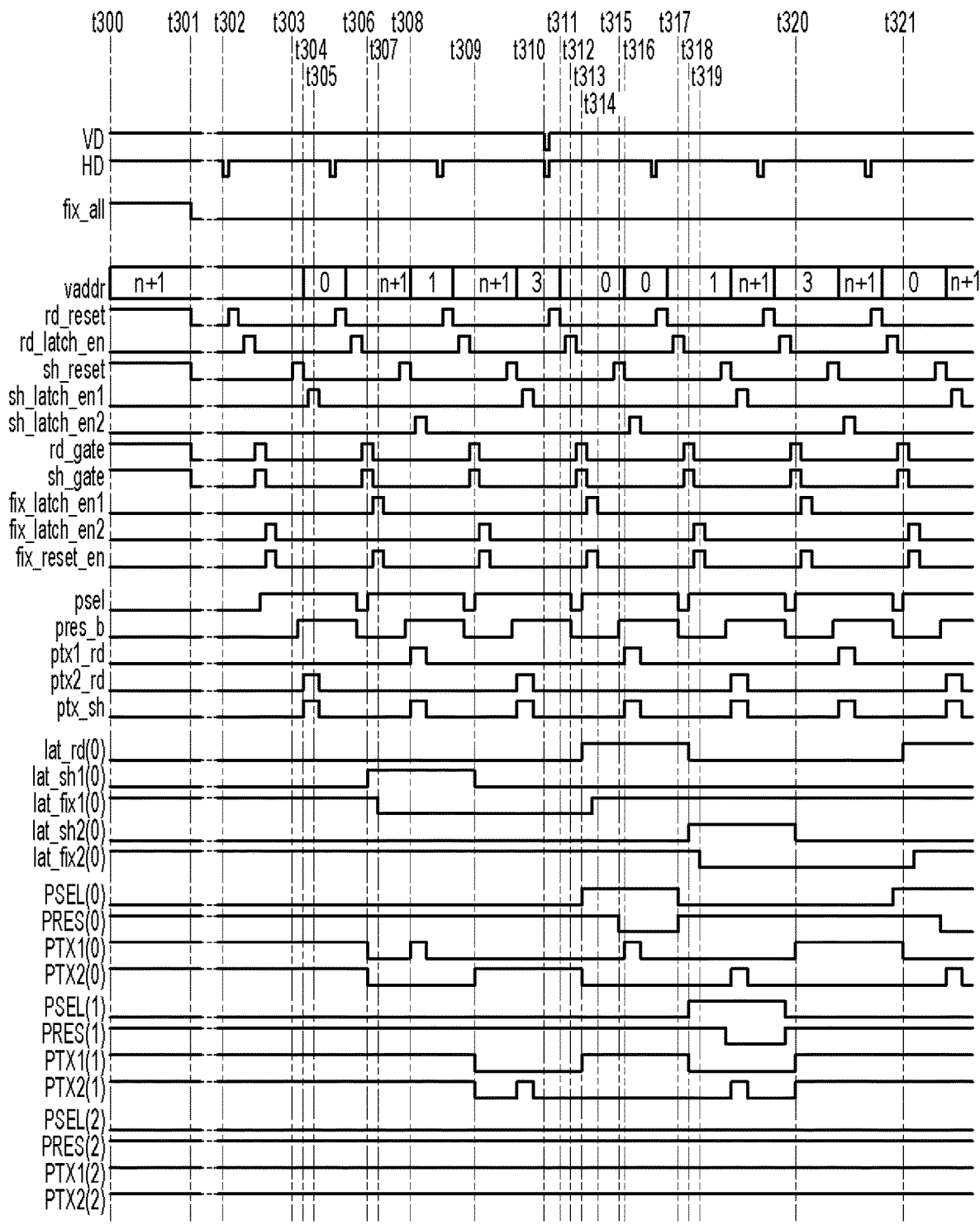
FIG. 11 is a timing chart illustrating a drive method of the vertical scanning unit and a pixel unit according to the third embodiment.

FIG. 11 is a timing chart illustrating a drive method of the vertical scanning unit 3c and the pixel unit 4c according to the third embodiment. In this drive method, an electronic shutter scan and a readout scan are sequentially performed partially in parallel in the order of each PD1 of the pixels Pc(0, 0) to Pc(m, 0) on the 0-th row, each PD2 of the pixels Pc(0, 1) to Pc(m, 1) on the first row, and then each PD2 of the pixels Pc(0, 0) to Pc(m, 0) on the 0-th row. Operations of the vertical scanning unit 3c and the pixel unit 4c will be described below with reference to FIG. 9 to FIG. 11 mainly for features different from those of the first embodiment.

During a period of the time t300 to t301, an initialization operation of the vertical scanning unit 3c and the pixel unit 4c is performed. In a similar manner to the first embodiment, at the time t300, the first storage unit 320 and the second storage unit 321c of the vertical scanning unit 3c are initialized. Thus, all the signals lat_rd(0) to lat_rd(n), lat_sh1(0) to lat_sh1(n), and lat_sh2(0) to lat_sh2(0) output from the first storage unit 320 and the second storage unit 321c are low level. Further, due to the signal fix_all being high level, the third storage unit 322c is initialized, and the signals lat_fix1(0) to lat_fix1(n) and lat_fix2(0) to lat_fix2(n) are high level. Thus, the signals PSEL(0) to PSEL(n) are low level, the signals PRES(0) to PRES(n) are high level, and the signals PTX1(0) to PTX1(n) and PTX2(0) to PTX2(n) are high level.

An initialization operation of the pixel unit 4c is similar to that in the first embodiment and, due to the signals PRES(0) to PRES(n) being high level, the reset transistor M2 on each rows is in a conductive state and each potential of the FD is initialized in accordance with the potential of the VCC. Further, since the signals PTX1(0) to PTX1(n) and PTX2(0) to PTX2(n) are also high level, the transfer transistors M11 and M12 are in a conductive state, charges accumulated in the PD1 and the PD2 are drained resulting in a reset state of the PD1 and PD2. In such a way, the pixels Pc on all the rows of the pixel unit 4 are reset and, at the time t301, the initialization of the vertical scanning unit 3c and the pixel unit 4c is completed.

Subsequently, during the time t302 to t309, an electronic shutter operation of each PD1 of the pixels Pc(0, 0) to Pc(m, 0) on the 0-th row is performed.

At the time t302, in response to a low-level pulse of the horizontal synchronous signal HD being input to the control unit 2, the control unit 2 starts control for operations on a row basis.

Around the time t303, the control unit 2 turns the signal sh_reset to a high level and then a low level. This causes the SR latches 3211b and 3211c to be reset.

At the time t304, in response to the control unit 2 setting the address signal vaddr to "0", the address decoder unit 31 decodes "0" and sets the decoded signal addr(0) to a high level.

Around the time t305, the control unit 2 turns the signal sh_latch_en1 to a high level and then a low level. At this time, since both of the signal sh_latch_en1 and the decoded signal addr(0) input to the AND circuit 3210b are high level, the output of the AND circuit 3210b, which is a logical product of these signals, also becomes high level. Thus, "1" is stored in the SR latch 3211b.

Around the time t306, the control unit 2 turns the signals rd_gate and sh_gate to a high level and then a low level. The D latch 3212b latches a high-level signal being input to the data input terminal D of the D latch 3212b from the SR latch 3211b at a timing when the signal sh_gate input to the gate input terminal G of the D latch 3212b is turned to a high level. As a result, the signal lat_sh1(0) output from the second storage unit is turned to a high level. At this time, since the signal lat_sh1(0) is high level and the signal lat_rd(0) is low level, the transfer signal generating unit 3230b outputs the value of the signal ptx_sh, that is, a low level. Thus, the signal PTX1(0) is turned to a low level, and a reset state of each PD1 of the pixels Pc(0, 0) to Pc(m, 0) is released.

On the other hand, the signal lat_rd(0) is low level, the signal lat_sh1(0) is high level, and the signal lat_sh2(0) is low level, which are input to the transfer signal generating unit 3230c. Therefore, the output signal of the transfer signal generating unit 3230c is low level. Thus, the signal PTX2(0) is turned to a low level, and a reset state of each PD2 of the pixels Pc(0, 0) to Pc(m, 0) is also released.

Around the time t307, the control unit 2 turns the signals fix_latch_en1 and fix_reset_en to a high level and then a low level. At this time, since the signal lat_rd(0) is low level, the output signal of the OR circuit 3222b is low level regardless of the signal fix_latch_en1. Further, since the signal lat_sh1(0) is high level, the output signal of the AND circuit 3221b is turned to be a high level and then a low level in accordance with the level of the signal fix_reset_en. Therefore, a high-level signal is input to the reset terminal R of the SR latch 3223b, and a reset state, that is, the second state "0" is held in the SR latch 3223b. Thus, the signal lat_fix1(0) output from the third storage unit 322c is turned to a low level. At this time, however, since the signal lat_rd(0) is low level and the signal lat_sh1(0) is high level, the signal PTX1(0) is maintained to the value of the signal ptx_sh, that is, a low level.

At the time t308, the control unit 2 turns the signals ptx1_rd and ptx_sh to a high level. At this time, since the signal lat_rd(0) is low level and the signal lat_sh1(0) is high level, the signal PTX1(0) is turned to a high level because the signal PTX1(0) corresponds to the value of the signal ptx_sh. Since the signal PRES(0) being input to the pixel Pc(0, 0) to Pc(m, 0) is high level, each reset transistor M2 is in a conductive state. Therefore, the potential of the FD is initialized in accordance with the potential of the VCC. Transition of the signal PTX1(0) to a high level causes the transfer transistor M11 to be switched to a conductive state, charges accumulated in the PD1 to be drained, and the PD1 to be reset. The control unit 2 then turns the values of the signals ptx1_rd and ptx_sh to a low level and, in response to the signal PTX1(0) being low level again, the transfer transistor M11 is switched to a non-conductive state. This causes the reset state of the PD1 to be released and the PD1 to be in a charge accumulation state.

On the other hand, since the signal output from the transfer signal generating unit 3230c is low level, the signal PTX2(0) is maintained to a low level. Thus, each PD2 of the pixels Pc(0, 0) to Pc(m, 0) is maintained to a state where the reset is released.

Around the time t309, the control unit 2 turns the signals rd_gate and sh_gate to a high level and then a low level. The signal lat_sh1(0), which is the output signal of the D latch 3212b, is turned to a low level. Since all the signals lat_sh1(0), lat_sh2(0), and lat_rd(0) are low level, the transfer signal generating unit 3230b outputs the value of the signal lat_fix1(0), that is, a low level. Thus, the signal PTX1(0) remains in a low level, and each PD1 of the pixels Pc(0, 0) to Pc(m, 0) maintains a charge accumulation state.

On the other hand, since all the signals lat_sh1(0), lat_sh2(0), and lat_rd(0) are low level, the transfer signal generating unit 3230c outputs the value of the signal lat_fix2(0), that is, a high level. Thus, the signal PTX2(0) is turned to a high level, which causes each PD2 of the pixels Pc(0, 0) to Pc(m, 0) to be again in a reset state.

In this way, an electronic shutter operation of the PD1 of the pixels Pc(0, 0) to Pc(m, 0) is completed.

Subsequently, during a period of the time t310 to t318, a readout operation of the PD1 of the pixels Pc(0, 0) to Pc(m, 0) on the 0-th row is performed. The operations of the address decoder unit 31, the first storage unit 320, and the transfer signal generating unit 3230c during a period of the time t310 to t318 are the same as those in the first embodiment, and the description thereof will be omitted. Therefore, the operations of the signal PSEL(0), PRES(0), and PTX1(0) and the readout operation of each PD1 of the pixels Pc(0, 0) to Pc(m, 0) are substantially the same as those in the first embodiment, and the description thereof will be omitted.

On the other hand, at the time t313, since the signal lat_rd(0) is high level, the transfer signal generating unit 3230c outputs the signal ptx2_rd. At this time, since the signal ptx2_rd is low level, the signal PTX2(0) is turned to a low level, and the reset state of each PD2 of the pixels Pc(0, 0) to Pc(m, 0) is released. Thereby, the charges accumulated in each PD1 of the pixels Pc(0, 0) to Pc(m, 0) on the 0-th row can be read out at the time 316.

During a period of the time t309 to t313, in a similar manner, an electronic shutter operation of each PD2 of the pixels Pc(0, 1) to Pc(m, 1) on the first row is performed. During a period of the time t318 to t320, in a similar manner, a readout operation of each PD2 of the pixels Pc(0, 1) to Pc(m, 1) on the first row is performed.

Further, also during a period of the time t318 to t320, in a similar manner, an electronic shutter operation of each PD2 of the pixels Pc(0, 0) to Pc(m, 0) on the 0-th row is performed. During a period on and after the time t321, a readout operation of each PD2 of the pixels Pc(0, 0) to Pc(m, 0) on the 0-th row is performed.

In the present embodiment, the transfer signal generating units 3230b and 3230c generate transfer signals for the PD1 and the PD2, respectively. In this generation, the transfer signal generating unit 3230b refers to the signals lat_rd($x$) and lat_sh2($x$), and the transfer signal generating unit 3230c refers to the signals lat_rd($x$) and lat_sh1($x$). That is, the signal lat_rd($x$) that is a signal for controlling a readout row is used commonly to the transfer signal generating units 3230b and 3230c. Further, the signal lat_sh1($x$) that is a signal for controlling an electric shutter row of the PD1 is referred also in generating a transfer signal for the PD2. The signal lat_sh2($x$) that is a signal for controlling an electric shutter row of the PD2 is referred also in generating a transfer signal for the PD1.

Such a configuration allows the present embodiment to perform an electronic shutter operation and a readout operation taking both the operation states of photodiodes into consideration. Therefore, in the present embodiment, the configuration and the drive method of the vertical scanning unit described in the first embodiment can be applied to an imaging device having a pixel configuration in which a plurality of photodiodes share one FD.

Fourth Embodiment

Figure 12:
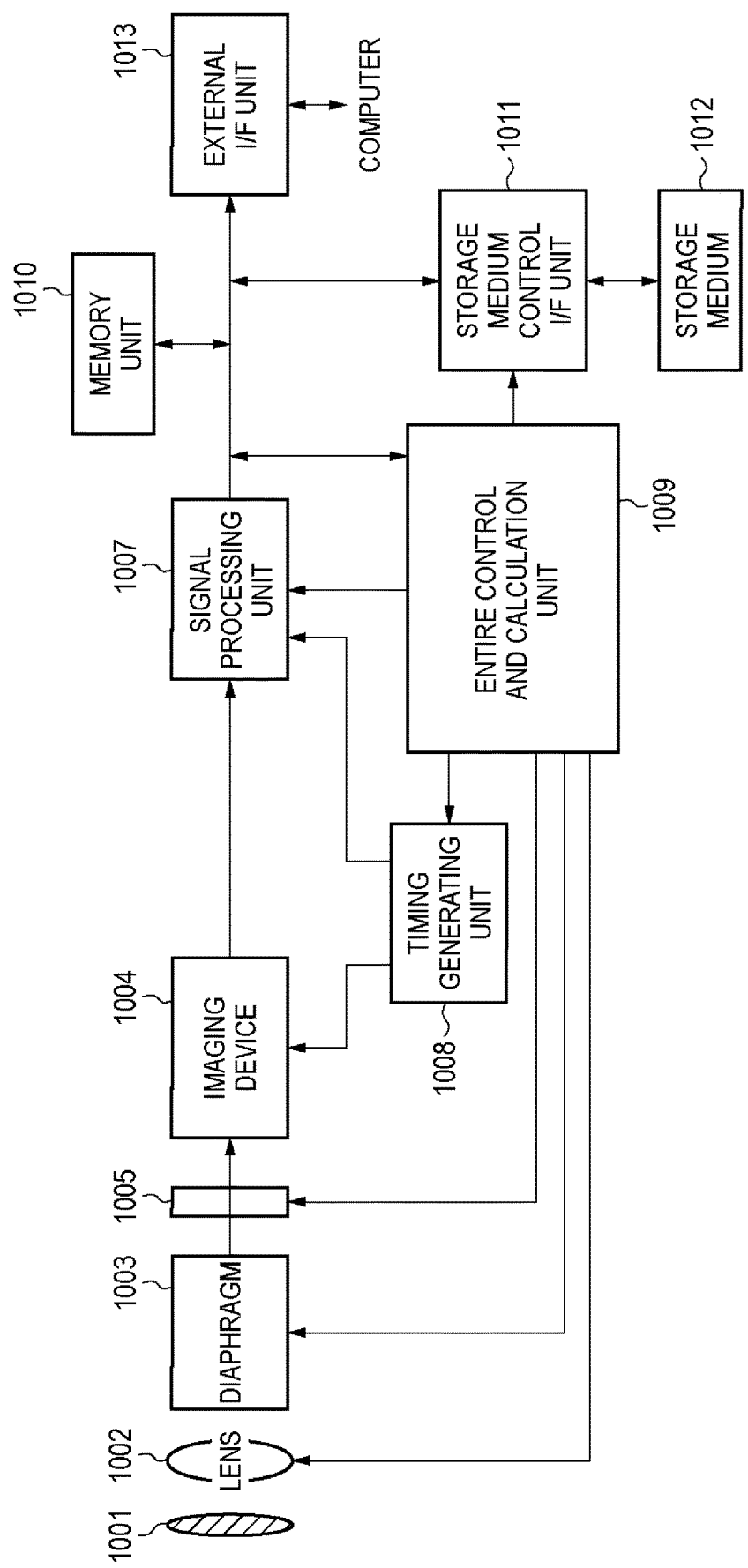
FIG. 12 is a block diagram of an imaging system according to a fourth embodiment.

An imaging system according to the fourth embodiment will be described. Examples of the imaging system may include a digital still camera, a digital camcorder, a copy machine, a facsimile, a mobile phone, an on-board camera, an observation satellite, and the like. FIG. 12 is a block diagram of the imaging system of the fourth embodiment. Although the imaging system of the present embodiment will be described as being a digital still camera, the present invention is not limited thereto and is applicable to other devices.

In FIG. 12, the imaging system has the imaging device 1004 illustrated in any of the first to third embodiments described above. Further, the imaging system further has a barrier 1001 for protection of a lens, a lens 1002 that captures an optical image of a subject on the imaging device 1004, a diaphragm 1003 for changing the amount of a light that has passed through the lens 1002, and a mechanical shutter 1005. The imaging device 1004 converts an optical image captured by the lens 1002 into image data. Here, an AD conversion unit is further formed on a semiconductor substrate on which the imaging device 1004 is formed. The imaging system further has a signal processing unit 1007, a timing generating unit 1008, an entire control and calculation unit 1009, a memory unit 1010, a storage medium control I/F unit 1011, a storage medium 1012, and an external I/F unit 1013. The signal processing unit 1007 performs various correction, data compression, and the like on an image data signal output from the imaging device 1004. The timing generating unit 1008 outputs various timing signals to the imaging device 1004 and the signal processing unit 1007. The entire control and calculation unit 1009 controls the entire digital still camera, and the memory unit 1010 functions as a frame memory for temporarily storing image data therein. The storage medium control I/F unit 1011 performs storage to or readout from a storage medium. The storage medium 1012 is formed of a removable semiconductor memory or the like and performs storage or readout of captured data. The external I/F unit 1013 is an interface for communicating with an external computer or the like. In this example, a timing signal or the like may be input from the outside of the imaging system, and the imaging system may be any imaging system having at least the imaging device 1004 and the signal processing unit 1007 that processes a captured signal output from the imaging device 1004.

In the present embodiment, a configuration in which the imaging device 1004 and the AD conversion unit are provided on the same semiconductor substrate has been described. However, the imaging device 1004 and the AD conversion unit may be formed on separate semiconductor substrates. Further, the imaging device 1004 and the signal processing unit 1007 may be formed on the same semiconductor substrate or may be formed on separate semiconductor substrates.

Furthermore, the signal processing unit 1007 may be configured to process a plurality of signals generated based on charges generated by a plurality of photodiodes and acquire information of the distance from the imaging device 1004 to a subject.

In the imaging system according to the present embodiment, the imaging device according to any of the first to third embodiments as the imaging device 1004 is used. This can realize an imaging system with a simplified process for driving the imaging device.

Other Embodiments

The configurations of the logic circuits, the latch circuits, the selectors, or the like of the row drive unit are not limited to the configurations of FIG. 3, FIG. 6, and FIG. 9, and any type of these configurations may be employed as long as similar functions can be realized.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-027193, filed Feb. 16, 2016, which is hereby incorporated by reference herein in its entirety.

What is claimed is:

1. An imaging device comprising:
a pixel unit in which pixels are arranged to form a plurality of rows, each of the pixels comprising a photoelectric conversion element that generates and accumulates charges in accordance with an incident light; and
a scanning unit comprising row drive units, each of the row drive units being arranged associated with each of the rows of the pixel unit and outputting a drive signal for driving the pixel unit on a row basis,
wherein each of the row drive units comprises:
a first storage unit configured to store a first signal for a readout from the pixels on an associated row and configured to output the first signal,
a second storage unit configured to store a second signal for an operation for causing the photoelectric conversion element on an associated row to be reset to a charge accumulation state and configured to output the second signal,
a third storage unit configured to store a third signal for maintaining the photoelectric conversion element on an associated row in the charge accumulation state or a reset state based on the first signal output from the first storage unit and the second signal output from the second storage unit and configured to output the third signal, and
a pixel drive signal generating unit configured to receive the first signal, the second signal and the third signal to generate the drive signal,
wherein the first storage unit and the third storage unit are connected via a first line for transmitting the first signal, and
wherein the first storage unit and the pixel drive signal generating unit are connected via a second line for transmitting the first signal.

2. The imaging device according to claim 1, wherein the third storage unit stores and outputs the third signal further based on a fourth signal for resetting the photoelectric conversion element on all the rows.

3. The imaging device according to claim 1, further comprising a control unit configured to output, to the scanning unit, an address signal indicating a row to be driven of the pixel unit,
wherein the scanning unit further comprises an address decoder unit configured to output, to each of the row drive units, a decoded signal generated by decoding the address signal, and
wherein the decoded signal is input to the first storage unit and the second storage unit.

4. The imaging device according to claim 2, further comprising a control unit configured to output, to the scanning unit, an address signal indicating a row to be driven of the pixel unit,
wherein the scanning unit further comprises an address decoder unit configured to output, to each of the row drive units, a decoded signal generated by decoding the address signal, and
wherein the decoded signal is input to the first storage unit and the second storage unit.

5. The imaging device according to claim 3, wherein the decoded signal is not directly input to the third storage unit.

6. The imaging device according to claim 4, wherein the decoded signal is not directly input to the third storage unit.

7. The imaging device according to claim 1, wherein each of the pixels further comprises:
an amplification transistor configured to output a signal based on charges transferred to an input node thereof, and
a transfer transistor configured to transfer charges accumulated in the photoelectric conversion element to the input node of the amplification transistor,
wherein each of the row drive units comprises a transfer signal generating unit configured to generate a transfer signal for control of the transfer transistor based on the first signal output from the first storage unit, the second signal output from the second storage unit, and the third signal output from the third storage unit.

8. The imaging device according to claim 2, wherein each of the pixels further comprises:
an amplification transistor configured to output a signal based on charges transferred to an input node thereof, and
a transfer transistor configured to transfer charges accumulated in the photoelectric conversion element to the input node of the amplification transistor,
wherein each of the row drive units comprises a transfer signal generating unit configured to generate a transfer signal for control of the transfer transistor based on the first signal output from the first storage unit, the second signal output from the second storage unit, and the third signal output from the third storage unit.

9. The imaging device according to claim 7, wherein, when the first signal indicates not to perform a readout from the pixels on an associated row and the second signal indicates not to perform an operation for causing the photoelectric conversion element on an associated row to be reset to the charge accumulation state, the transfer signal generating unit uses the third signal to generate the transfer signal.

10. The imaging device according to claim 8, wherein, when the first signal indicates not to perform a readout from the pixels on an associated row and the second signal indicates not to perform an operation for causing the photoelectric conversion element on an associated row to be reset to the charge accumulation state, the transfer signal generating unit uses the third signal to generate the transfer signal.

11. The imaging device according to claim 1,
wherein each of the pixels comprises a plurality of the photoelectric conversion elements, wherein each of the pixels further comprises:
an amplification transistor configured to output a signal based on charges transferred to an input node thereof, and
transfer transistors each of which is provided to each of the plurality of the photoelectric conversion elements and transfers charges accumulated in each of the plurality of the photoelectric conversion elements to the input node of the amplification transistor,
wherein the second storage unit comprises a plurality of storage circuits each of which is provided associated with each of the plurality of the photoelectric conversion elements and outputs the second signal,
wherein the third storage unit comprises a plurality of storage circuits each of which is provided associated with each of the plurality of the photoelectric conversion elements and outputs the third signal, and
wherein each of the row drive units comprises a plurality of transfer signal generating units, and each of the plurality of transfer signal generating units is provided associated with each of the plurality of the photoelectric conversion elements and generates a transfer signal for control of the transfer transistor based on the first signal output from the first storage unit, based on a plurality of the second signals each output from each of the plurality of storage circuits of the second storage unit, and based on the third signal output from one of the plurality of storage circuits of the third storage unit.

12. The imaging device according to claim 2,
wherein each of the pixels comprises a plurality of the photoelectric conversion elements,
wherein each of the pixels further comprises:
an amplification transistor configured to output a signal based on charges transferred to an input node thereof, and
transfer transistors each of which is provided to each of the plurality of the photoelectric conversion elements and transfers charges accumulated in each of the plurality of the photoelectric conversion elements to the input node of the amplification transistor,
wherein the second storage unit comprises a plurality of storage circuits each of which is provided associated with each of the plurality of the photoelectric conversion elements and outputs the second signal,
wherein the third storage unit comprises a plurality of storage circuits each of which is provided associated with each of the plurality of the photoelectric conversion elements and outputs the third signal, and
wherein each of the row drive units comprises a plurality of transfer signal generating units, and each of the plurality of transfer signal generating units is provided associated with each of the plurality of the photoelectric conversion elements and generates a transfer signal for control of the transfer transistor based on the first signal output from the first storage unit, based on a plurality of the second signals each output from each of the plurality of storage circuits of the second storage unit, and based on the third signal output from one of the plurality of storage circuits of the third storage unit.

13. The imaging device according to claim 11, wherein, when the first signal indicates not to perform a readout from the pixels on an associated row and all of the plurality of the second signals indicates not to perform an operation for causing the photoelectric conversion element on an associated row to be reset to the charge accumulation state, the transfer signal generating unit uses the third signal to generate the transfer signal.

14. The imaging device according to claim 12, wherein, when the first signal indicates not to perform a readout from the pixels on an associated row and all of the plurality of the second signals indicates not to perform an operation for causing the photoelectric conversion element on an associated row to be reset to the charge accumulation state, the transfer signal generating unit uses the third signal to generate the transfer signal.

15. An imaging system comprising:
the imaging device according to claim 1; and
a signal processing unit configured to process a signal output from the imaging device.

16. The imaging system according to claim 15, wherein the third storage unit stores and outputs the third signal further based on a fourth signal for resetting the photoelectric conversion elements on all the rows.

* * * * *